US012545346B2

(12) United States Patent
Zuraski et al.

(10) Patent No.: US 12,545,346 B2
(45) Date of Patent: *Feb. 10, 2026

(54) LOCK MOUNTING ASSEMBLIES FOR TRANSPORTATION DEVICES

(71) Applicant: Schlage Lock Company LLC, Carmel, IN (US)

(72) Inventors: Robert D. Zuraski, Taunton, MA (US); Daniel H. Kindstrand, Tucson, AZ (US); David B. Miller, Braintree, MA (US); Alison J. Donlan, Hanover, MA (US); Donald H. Warren, Natick, MA (US); Michael Tintsman, Malden, MA (US); John D. Fiegener, Marblehead, MA (US); Caitlin A Thompson, Cambridge, MA (US); Gregory R. Meyer, Amesbury, MA (US); Thomas A. Gernetzke, Charlestown, MA (US); William J. Vespa, Salem, MA (US); Matthew R. Gill, North Ridgeville, OH (US); William Liteplo, Middleton, MA (US)

(73) Assignee: Schlage Lock Company LLC, Carmel, IN (US)

( * ) Notice: Subject to any disclaimer, the term of this patent is extended or adjusted under 35 U.S.C. 154(b) by 295 days.

This patent is subject to a terminal disclaimer.

(21) Appl. No.: 18/242,273

(22) Filed: Sep. 5, 2023

(65) Prior Publication Data

US 2024/0246626 A1 Jul. 25, 2024

Related U.S. Application Data

(60) Division of application No. 17/468,119, filed on Sep. 7, 2021, now Pat. No. 11,745,815, which is a division
(Continued)

(51) Int. Cl.
*B62H 5/00* (2006.01)
*B62J 11/00* (2020.01)
(Continued)

(52) U.S. Cl.
CPC ............... *B62H 5/00* (2013.01); *B62J 11/00* (2013.01); *E05B 17/00* (2013.01); *E05B 71/00* (2013.01);
(Continued)

(58) Field of Classification Search
CPC ............ B62J 11/00; E05B 17/00; E05B 71/00
See application file for complete search history.

(56) References Cited

U.S. PATENT DOCUMENTS

| 470,878 A | 3/1892 | Mease |
| 613,038 A | 10/1898 | Hill |

(Continued)

FOREIGN PATENT DOCUMENTS

| CN | 2131761 Y | 5/1993 |
| CN | 2291357 Y | 9/1998 |

(Continued)

OTHER PUBLICATIONS

Chinese Search Report; National International Property Administration, P.R. China; Chinese Patent Application No. 201610332795.5; Nov. 13, 2018; 5 pages.
(Continued)

*Primary Examiner* — Brian D Nash
(74) *Attorney, Agent, or Firm* — Taft Stettinius & Hollister LLP

(57) ABSTRACT

Lock mounting assemblies are disclosed for storing and mounting a locking apparatus to a transportation device. The mounting assemblies include one or more straps or connectors for securing the mounting assembly to the transportation device. The mounting assemblies having a structure to
(Continued)

securely retain the locking apparatus on the transportation device and provide easy access to and release of the locking apparatus from the mounting assembly.

25 Claims, 24 Drawing Sheets

Related U.S. Application Data of application No. 16/709,319, filed on Dec. 10, 2019, now Pat. No. 11,110,980, which is a division of application No. 16/050,077, filed on Jul. 31, 2018, now Pat. No. 10,501,135, which is a division of application No. 15/156,932, filed on May 17, 2016, now Pat. No. 10,035,552, which is a division of application No. 14/089,290, filed on Nov. 25, 2013, now Pat. No. 9,340,997, which is a continuation of application No. PCT/US2012/039630, filed on May 25, 2012.

(60) Provisional application No. 61/519,564, filed on May 25, 2011.

(51) Int. Cl.
 *E05B 17/00* (2006.01)
 *E05B 71/00* (2006.01)
(52) U.S. Cl.
 CPC ... *B62H 2005/008* (2013.01); *Y10T 24/44009* (2015.01)

(56) References Cited

U.S. PATENT DOCUMENTS

| | | |
|---|---|---|
| 632,858 A | 9/1899 | Waibel et al. |
| 669,677 A | 3/1901 | Bray |
| 3,888,397 A | 6/1975 | Koizumi |
| 4,155,231 A | 5/1979 | Zane et al. |
| 4,697,725 A | 10/1987 | Miree |
| 4,736,921 A | 4/1988 | Zane et al. |
| 4,966,382 A | 10/1990 | Giles |
| 5,076,526 A | 12/1991 | Zane et al. |
| 5,127,562 A | 7/1992 | Zane et al. |
| 5,133,568 A | 7/1992 | Balterman |
| 5,156,031 A | 10/1992 | Gaul |
| 5,181,774 A | 1/1993 | Lane |
| 5,226,341 A | 7/1993 | Shores |
| 5,251,796 A | 10/1993 | Shelhart |
| 5,291,765 A | 3/1994 | Hoisington |
| 5,386,961 A | 2/1995 | Lu |
| 5,395,016 A | 3/1995 | Minoura |
| 5,395,018 A | 3/1995 | Studdiford |
| 5,405,113 A | 4/1995 | Jaw |
| 5,458,308 A | 10/1995 | Lin |
| 5,464,135 A | 11/1995 | Studdiford |
| 5,538,167 A | 7/1996 | Winner |
| 5,551,609 A | 9/1996 | Best |
| 5,647,520 A | 7/1997 | McDaid |
| 5,653,365 A | 8/1997 | Lee |
| 5,662,255 A | 9/1997 | Lu |
| 5,669,536 A | 9/1997 | Wang |
| 5,673,889 A | 10/1997 | DeValcourt |
| 5,704,526 A | 1/1998 | Kuo |
| 5,706,679 A | 1/1998 | Zane et al. |
| 5,718,134 A | 2/1998 | Chang |
| 5,761,934 A | 6/1998 | Kuo |
| 5,832,762 A | 11/1998 | McDaid |
| 5,833,188 A | 11/1998 | Studdiford et al. |
| 5,836,491 A | 11/1998 | Chuang |
| 5,893,501 A | 4/1999 | Schwimmer |
| 5,913,466 A | 6/1999 | Revels |
| 6,016,673 A | 1/2000 | McDaid |
| 6,036,215 A | 3/2000 | Bruner |
| 6,042,065 A | 3/2000 | Benjamin |
| 6,044,669 A | 4/2000 | Levi |
| 6,096,386 A | 8/2000 | Kuo |
| 6,206,258 B1 | 3/2001 | Calder |
| 6,321,961 B1 | 11/2001 | McDaid et al. |
| 6,422,442 B1 | 7/2002 | McDaid et al. |
| 6,557,808 B1 | 5/2003 | Ling |
| 6,619,084 B2 | 9/2003 | Kuo |
| 6,971,564 B2 | 12/2005 | Yang |
| 7,311,233 B2 | 12/2007 | Chen |
| 7,654,550 B2 | 2/2010 | Chuang |
| 7,815,082 B1 | 10/2010 | Amone et al. |
| 8,083,112 B2 | 12/2011 | Kuo |
| 8,087,558 B2 | 1/2012 | Tsai |
| 8,371,000 B1 | 2/2013 | Schultz |
| 8,851,348 B2 | 10/2014 | Zuraski et al. |
| 9,079,626 B2 | 7/2015 | Zuraski et al. |
| 9,174,691 B2 | 11/2015 | Goldwater |
| 9,200,654 B1 | 12/2015 | Parduhn |
| 9,340,997 B2 | 5/2016 | Zuraski et al. |
| 9,386,824 B1 | 7/2016 | Schultz |
| 9,402,381 B1 | 8/2016 | Craddock et al. |
| 9,822,557 B2 | 11/2017 | Zuraski et al. |
| 2002/0026694 A1 | 3/2002 | Bremicker |
| 2002/0113185 A1 | 8/2002 | Ziegler |
| 2003/0029209 A1 | 2/2003 | Kuo |
| 2003/0075652 A1 | 4/2003 | Studdiford et al. |
| 2004/0031834 A1 | 2/2004 | Barr |
| 2004/0041065 A1 | 3/2004 | Ling |
| 2005/0011921 A1 | 1/2005 | Yang |
| 2005/0035165 A1 | 2/2005 | Tsai |
| 2005/0092798 A1 | 5/2005 | Borgman et al. |
| 2006/0124679 A1 | 6/2006 | Chen |
| 2007/0108244 A1 | 5/2007 | Chuang |
| 2008/0223095 A1 | 9/2008 | Young |
| 2008/0296329 A1* | 12/2008 | Guckes ............... B62J 9/23 224/412 |
| 2009/0159626 A1 | 6/2009 | Hoidal et al. |
| 2010/0139344 A1 | 6/2010 | Kuo |
| 2010/0163589 A1 | 7/2010 | Kwak et al. |
| 2010/0200630 A1 | 8/2010 | Yu et al. |
| 2010/0327132 A1 | 12/2010 | Maguire |
| 2011/0006094 A1 | 1/2011 | Tsai |
| 2011/0265526 A1 | 11/2011 | Zuraski |
| 2013/0015219 A1 | 1/2013 | Zuraski et al. |
| 2013/0248571 A1 | 9/2013 | Jones |
| 2013/0327801 A1 | 12/2013 | Prescott et al. |
| 2014/0042201 A1 | 2/2014 | Weiershausen et al. |
| 2014/0182094 A1 | 7/2014 | Zuraski et al. |
| 2017/0029055 A1 | 2/2017 | Chen |
| 2017/0088209 A1 | 3/2017 | Chiu |
| 2019/0135363 A1 | 5/2019 | Avolio |
| 2024/0116588 A1* | 4/2024 | Silfen ............... B62J 9/30 |
| 2024/0227962 A1* | 7/2024 | Campbell ............ B62K 15/006 |
| 2025/0065977 A1* | 2/2025 | Townley ............... B62J 11/00 |

FOREIGN PATENT DOCUMENTS

| | | |
|---|---|---|
| CN | 2347851 Y | 11/1999 |
| CN | 1524047 A | 8/2004 |
| CN | 201208996 Y | 3/2009 |
| CN | 201249833 Y | 6/2009 |
| CN | 101786479 A | 7/2010 |
| CN | 201800827 U | 4/2011 |
| CN | 20261956 U | 1/2013 |
| DE | 102008026739 A1 | 12/2009 |
| EP | 0620149 A1 | 10/1994 |
| JP | 06299743 A | 10/1994 |
| JP | 08-282564 A | 10/1996 |
| JP | 2010155578 A | 7/2010 |
| WO | 200224516 A1 | 3/2002 |
| WO | 2011025910 A1 | 3/2011 |

OTHER PUBLICATIONS

Chinese Office Action; National Intellectual Property Administration, P.R. China; Chinese Patent Application No. 2016103312795.5; Nov. 23, 2018; 15 pages.

(56) References Cited

OTHER PUBLICATIONS

International Search Report and Written Opinion; International Patent Application No. PCT/US2012/039630; Date of Mailing Aug. 7, 2012; 12 pages.
European Patent Office; European Search Report issued in European Patent Application No. 12789617 dated Aug. 15, 2015; 9 pages.
English Translation of Chinese Office Action; State Intellectual Property Office of People's Republic of China; Chinese Patent Application No. 201280036817.3; Aug. 5, 2015; 11 pages.
Supplementary European Search Report; European Patent Office; European Patent Application No. 12789617.3; Dec. 7, 2015; 17 pages.
Chinese Search Report; State Intellectual Property Office of People's Republic of China; Chinese Patent Application No. 2016103321795.5; Mar. 20, 2018; 5 pages.
Chinese First Office Action; State Intellectual Property Office of People's Republic of China; Chinese Patent Application No. 201610332795.5; Mar. 28, 2018; 13 pages.
European Examination Report; European Patent Office; European Patent Application No. 17203746.7; Apr. 26, 2019; 4 pages.
Chinese Search Report; National Intellectual Property Administration; People's Republic of China; Chinese Patent Application No. 201910389056.3; Apr. 13, 2020; 5 pages.
Chinese First Office Action; National Intellectual Property Administration, People's Republic of China, Chinese Patent Application No. 201910389056.3; Apr. 22, 2020; 13 pages.

\* cited by examiner

LOCK MOUNTING ASSEMBLIES FOR TRANSPORTATION DEVICES

CROSS-REFERENCE TO RELATED APPLICATIONS

The present application is a divisional of U.S. patent application Ser. No. 17/468,119 filed Sep. 7, 2021 and issued as U.S. Pat. No. 11,745,815, which is a divisional of U.S. patent application Ser. No. 16/709,319 filed Dec. 10, 2019 and issued as U.S. Pat. No. 11,110,980, which is a divisional of U.S. patent application Ser. No. 16/050,077 filed on Jul. 31, 2018 and issued as U.S. Pat. No. 10,501,135, which is a divisional of U.S. patent application Ser. No. 15/156,932 filed on May 17, 2016 and issued as U.S. Pat. No. 10,035,552, which is a divisional of U.S. patent application Ser. No. 14/089,290 filed on Nov. 25, 2013 and issued as U.S. Pat. No. 9,340,997, which is a continuation of International Patent Application No. PCT/US2012/039630 filed on May 25, 2012, which claims the benefit of U.S. Provisional Application No. 61/519,564 filed on May 25, 2011. The disclosure of each of the prior applications is incorporated herein by reference in its entirety.

BACKGROUND

The present invention relates to mounting assemblies for temporarily stowing locks, for example, bicycle U-locks and cable locks, when not in use, and for releasing the locks for ready use when needed or maintaining a portion of the lock housing during use.

Since the invention of bicycle U-locks and cable locks, a variety of holders have been proposed for removably carrying such a lock when the bicycle is in use, rather than parked. Such a U-lock typically comprises a semi-enclosure member or shackle having legs or fittings with configured feet, a straight crossbar having openings for reception of these feet, and a locking mechanism in the crossbar for retaining or releasing these feet. Such a cable lock typically comprises a cable having at one end a leg or fitting with a configured foot, a bar extending from the other end of the cable and having an opening for reception of this foot, and a locking mechanism in the bar for retaining or releasing this foot. For protection against theft, this tie lock assemblage ties a strut or the like of the bicycle to a post, rail or other station.

The objectives of a holder for such locks are to carry the lock securely on the bicycle frame without rattling, to position the lock inconspicuously on the bicycle frame without hindering movement of the cyclist, and yet to facilitate convenient release of the lock from the holder whenever needed. Prior art holders have not completely met these objectives.

SUMMARY

There is disclosed herein multiple embodiments of lock mounting assemblies for mounting a locking apparatus to a transportation device. The mounting assemblies include straps or connectors for securing the mounting assembly to a transportation device such as a bicycle, motorcycle, scooter, or the like. Each mounting assembly has a structure to securely retain the locking apparatus on the transportation device in a manner and/or location that does not interfere with operation or handling of the transportation device and which also provides easy release of and access to the locking apparatus from the mounting assembly.

DETAILED DESCRIPTION

Although the invention is illustrated and described herein with reference to specific embodiments, the invention is not intended to be limited to the details shown. Rather, various modifications may be made in the details within the scope and range of equivalents of the claims and without departing from the invention.

Figure 6:
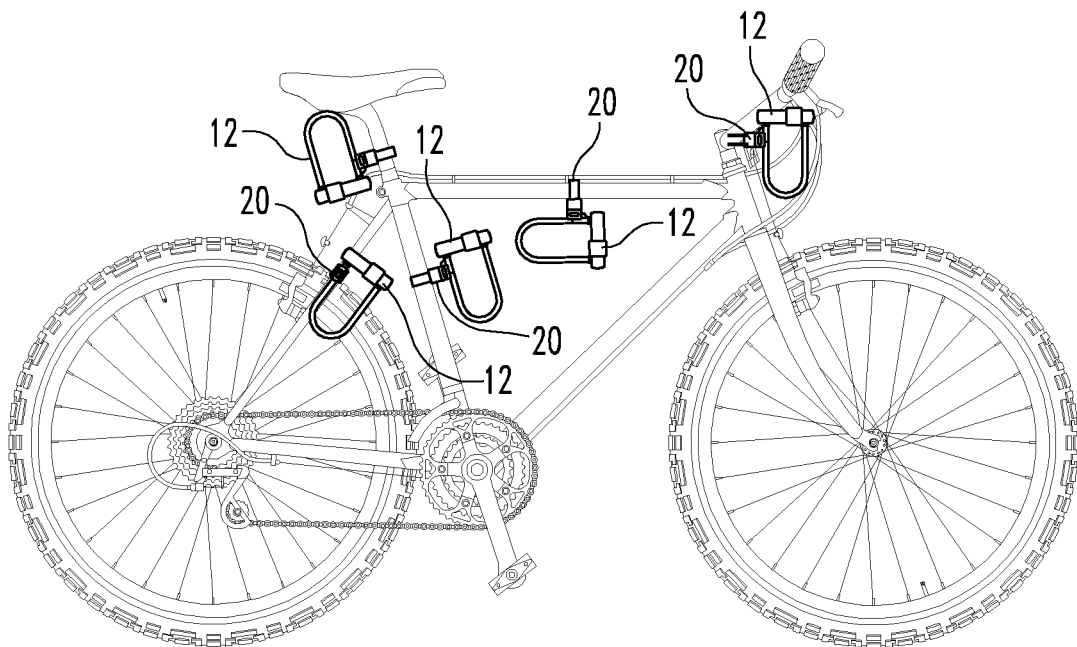
FIG. 6 is a side elevation view of a bicycle illustrating the lock mounting assembly of FIG. 1 mounted to the bicycle at exemplary locations.

There is disclosed herein various mounting assemblies for removably securing and mounting a locking apparatus to a transportation device. For example, FIG. 6 shows several mounting assemblies 20 attached to a bicycle frame at various positions with a U-lock 12 type locking apparatus supported in each of the mounting assemblies 20. The U-lock 12 includes a lock housing 14 and a shackle 16. Lock housing 14 defines a first portion of the locking apparatus and shackle 16 defines a second portion of the locking apparatus. The locking apparatus is operable to lock the transportation device to an object, such as a rack, stand, pole or other secure object, to prevent or discourage theft of the transportation device. In certain embodiments of the mounting assemblies described herein, the mounting assembly is releasably engaged to the first portion to mount the locking apparatus to the transportation device. Other embodiments releasably engage the second portion, or both the first and second portions, to mount the locking apparatus to the transportation device. While the mounting assemblies are illustrated herein with a U-lock and cable lock type lacking apparatuses, the invention is not limited to such and may be utilized with various portable locks and locking apparatus, including, but not limited to, modular locks as described in PCT International Application No. PCT/US09/048226, incorporated herein by reference. Additionally, while the mounting assemblies illustrated herein are shown attached to a bicycle frame, the invention is not limited to such, but may be utilized in various applications and with various transportation devices, including, but not limited to, bikes, motorcycles, scooters, all-terrain vehicles, three-wheeled vehicles, and carts, for example.

Figure 1:
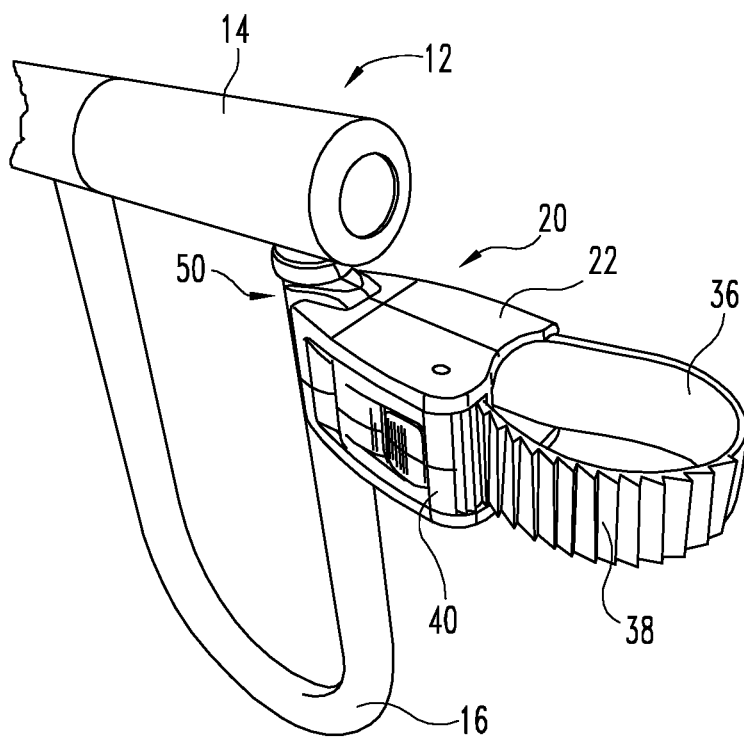
FIG. 1 is an isometric view of a lock mounting assembly in accordance with an exemplary embodiment of the invention connected to a U-lock.
Figure 2:
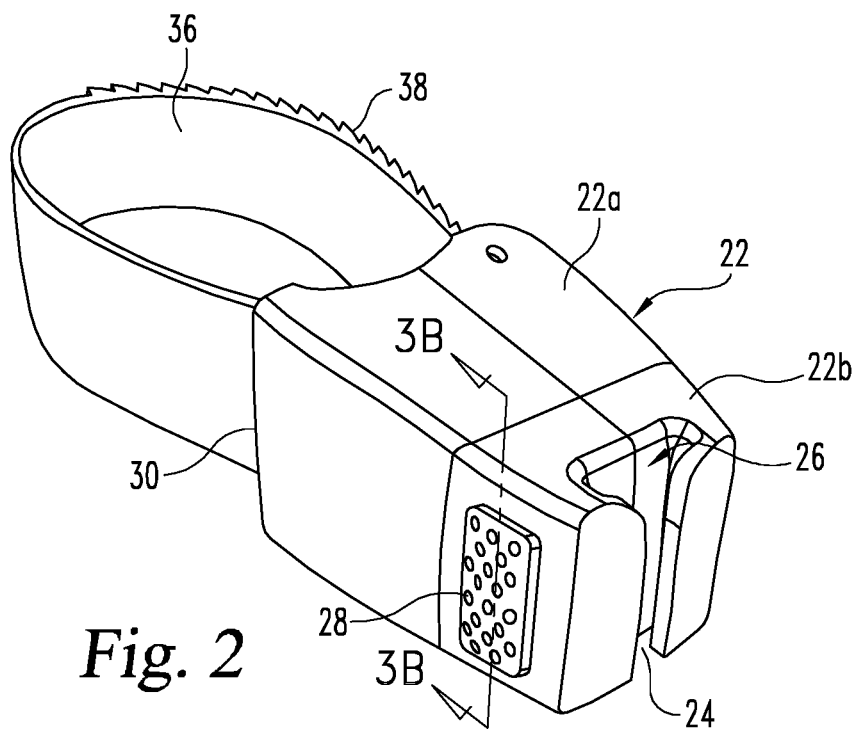
FIG. 2 is an isometric view of the bracket member of the lock mounting assembly of FIG. 1.
Figure 3:
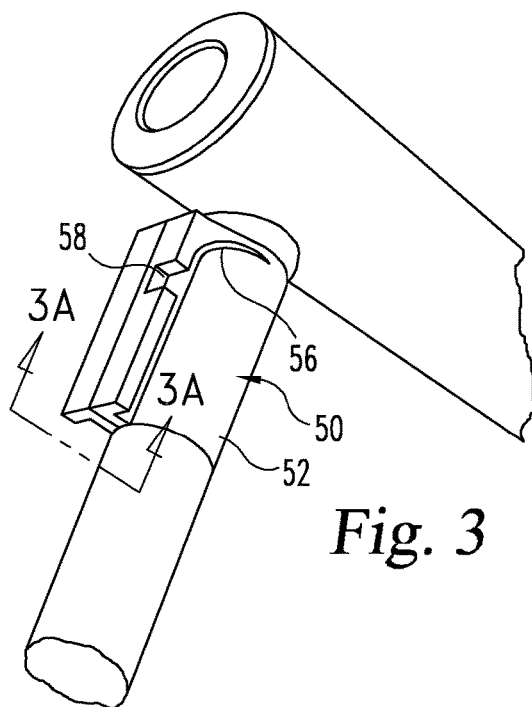
FIG. 3 is an isometric view of the spline member of the lock mounting assembly of FIG. 1.
Figure 3A:
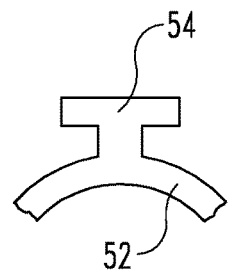
FIG. 3A is a plan view along the line 3A-3A in FIG. 3.
Figure 3B:
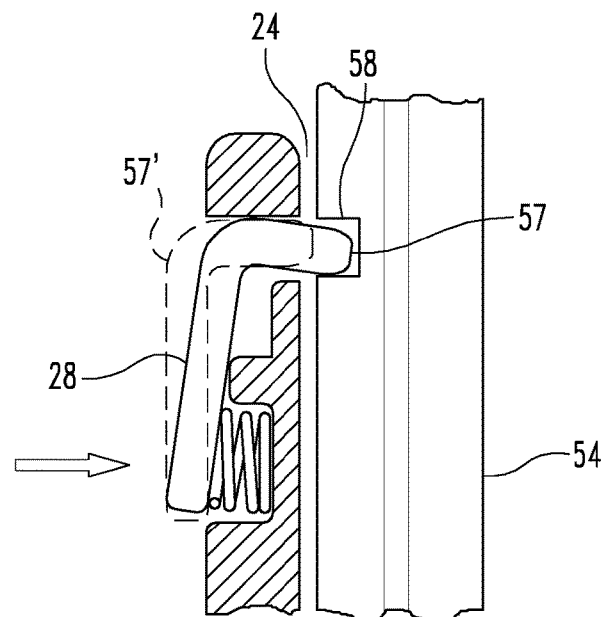
FIG. 3B is a section view along the line 3B-3B in FIG. 3.

Referring now to FIGS. 1-6, mounting assembly 20 of one exemplary embodiment generally comprises a bracket body 22, a strap 36, a lever 40 and a spline member 50. With reference to FIGS. 2, 3 and 3A, the spline member 50 includes a collar 52 which is connectable to a portion of a portable lock, for example, to the shackle 16 of the illustrated U-lock 12. A spline 54 having a generally T configuration extends from the collar 52. A stop 56 extends between the spline 54 and collar 52 at one end of the spline 54 and is configured to contact the bracket body 22 to stop passage of the spline 54 through a receiving slot 24 in the bracket body 22. The slot 24 includes a funnel shaped opening 26 which directs the spline 54 into the slot 24. The spline 54 includes a notch 58 configured to receive a retaining pin 57 extending into the receiving slot 24. A release button 28 is retained on the bracket body 22 and is configured to release the retaining pin 57 from the notch 58, as indicated by retaining pin 57', to facilitate removal of the spline 54 from the slot 24. In the illustrated embodiment, release button 28 is spring biased at one end so pin 57 normally projects into slot 24, and can be pressed against the spring bias to move pin 57 from notch 58 and slot 24, as shown in FIG. 3B.

Figure 2A:
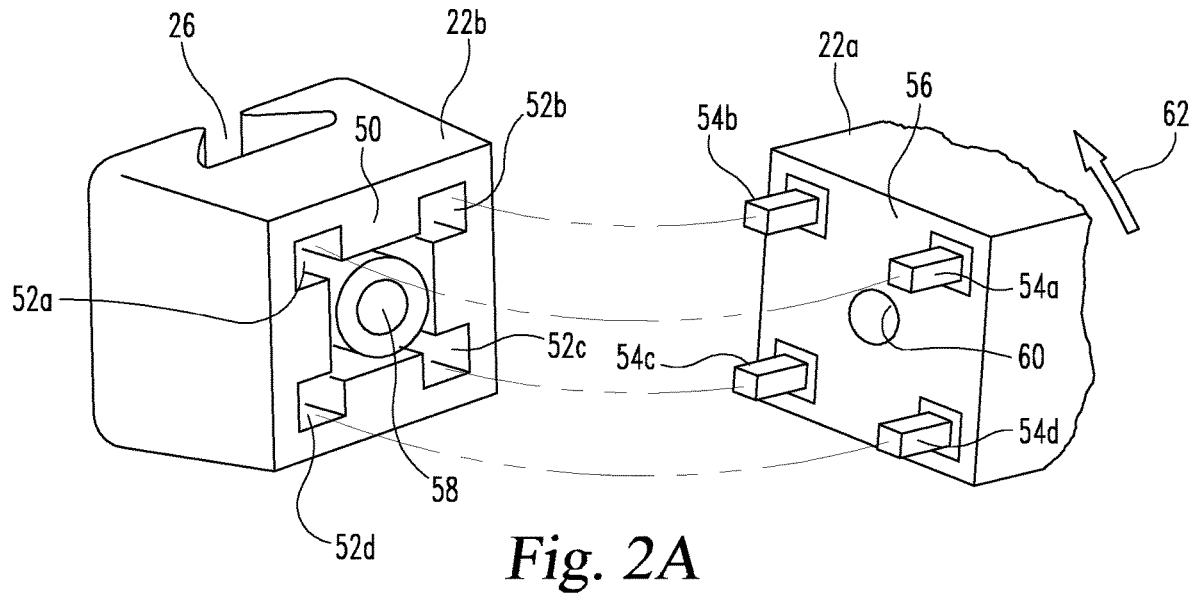
FIG. 2A is an exploded isometric view showing a portion of the bracket of the locking mounting assembly of FIG. 1.

The bracket body 22 may include two portions 22a and 22b which are adjustable relative to one another, e.g. via a removable screw connection, to allow the orientation of the slot 24 to be adjusted relative to the orientation of the strap 36. For example, in the illustrated embodiment strap 36 and slot 24 both open in the same direction. Bracket portion 22a can be rotated so that strap 36 opens in a direction that is oriented 90 degrees to the opening of slot 24. For example, in an embodiment shown in FIG. 2A, portion 22a includes an inner wall 50 defining four receptacles 52a, 52b, 52c, 52d and portion 22b includes an inner wall 56 with four projection members 54a, 54b, 54c, 54d that are positionable in respective ones of the receptacles 52a, 52b, 52c, 52d to non-rotatably secure portions 22a, 22b to one another. A bolt or other suitable connector is positionable through hole 58 of portion 22a and into hole 60 of portion 22b to secure portions 22a, 22b to one another. If it is desired to change the orientation of bracket portion 22a and its receiving slot 26 relative to the opening defined by strap 36, portions 22a, 22b can be uncoupled from one another with the fastener and rotated as indicated by arrow 62 so that, for example, projection 54a is received in receptacle 52b, projection 54b is received in receptacle 52c, projection 54c is received in receptacle 52d, and projection 54d is received in receptacle 52a, and then re-secured to one another with the fastener. Rotation in the opposite direction and rotation 180 degrees is also possible. In still other embodiments, more than four rotation positions are provided so that adjustments of less than 90 degrees are possible.

Figure 2B:
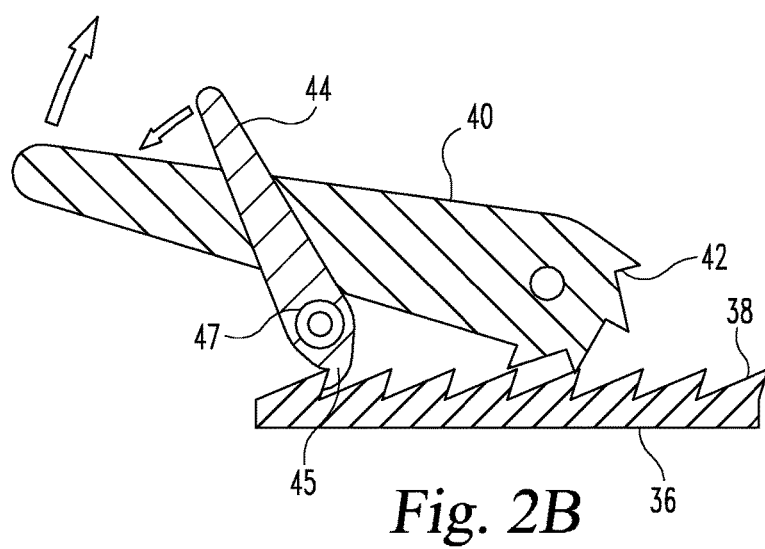
FIG. 2B is a section view along line 2B-2B of FIG. 4.
Figure 5:
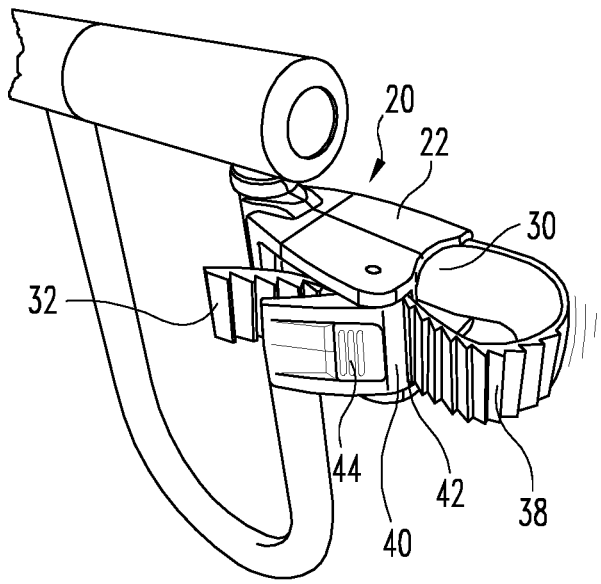
FIG. 5 is a view similar to FIG. 1 illustrating the strap during a mounting procedure.

The strap 36 is connected to the bracket body 22 at a fixed end 30 and includes a free end 32. The fixed end 30 may be adjustably connected to a first side of the bracket body 22. Free end 32 of strap 36 has a series of transverse ridges 38, the leading faces of which are obliquely oriented with respect to the general surface of the strap and the trailing faces of which are perpendicularly oriented with respect to the general surface of the strap. As shown in FIG. 5, to attach the bracket body 22, the strap 36 is looped around the object and the free end 32 is passed by the external ratchet teeth 42 of the lever 40 through a channel 43 defined in the second side of bracket body 22. In order to tighten strap 36 to the transportation device, lever 40 mounted in channel 43 is pivoted to an outward position such that the external ratchet teeth 42 face toward the bracket body 22 and engage ridges 38 to displace the strap 36 further into bracket body 22. Once the desired tightness of strap 36 around the object or portion of the transportation device is achieved, tab 44 includes a tooth 45 that engages an aligned ridge 38 to hold strap 36 in place, as shown in FIG. 2B.

Figure 4:
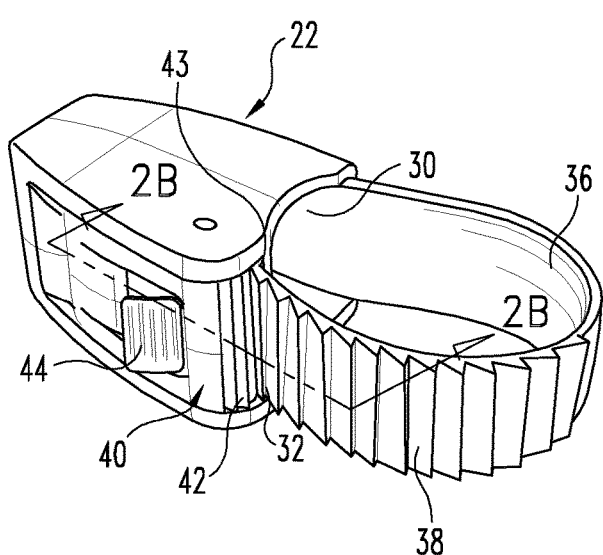
FIG. 4 is an isometric view of the bracket member of the lock mounting assembly of FIG. 1 illustrating the strap release tab actuated.

Upon rotation of the lever 40 to the closed position, as shown in FIG. 1, the internal ratchet tooth 45 attached to tab 44 engages the ridges 38 and maintains tension on the strap 36. As the strap 36 is fed into bracket 22 by lever 40, the ramped portion of ridges 38 push locking tab 44 back against the torsion spring 47 and allow strap 36 to be moved further into channel 43 of bracket 22, and the tooth 45 on tab 44 indexes to the next ridge 38 on strap 36. To release the strap 36, the tab 44 is pivoted as shown in FIG. 1 to release the internal tooth 45 from the engaged ridge 38 such that the strap 36 may be removed from channel 43. In one embodiment, tab 44 is torsionally loaded with spring 47 to a normally outwardly pivoted position so that its inner tooth 45 normally engages a respective ridge 38 on strap 36 as shown in FIG. 4. Tab 44 is depressed to a position such as shown in FIG. 1 to release its tooth 45 from the engaged ridge 38 and allow strap 36 to be withdrawn from channel 43.

In accordance with one aspect of the mounting assembly of FIGS. 1-6, there is disclosed a transportation device accessory that includes a locking apparatus configured to secure the transportation device to an object and a mounting assembly mountable to the transportation device and to the locking apparatus. The mounting assembly includes a bracket with a first portion movably coupled to a second portion. The mounting assembly also includes a member such as a strap extending from the first portion that is mountable to the transportation device. The member includes a first end fixedly connected to a first side of the first portion of the bracket. The first portion of the bracket defines a channel opening along a second a second side of the first portion that is opposite the first side. The bracket further includes a lever pivotably mounted to the second side along the channel to define an opening in a first position of the lever for receiving a second end of the member that is opposite the first end, wherein the lever is movable from the first position to a second position in locking engagement with the member in the channel. The bracket further includes a tab pivotably mounted to the lever, and the tab is movable relative to the lever and the member to release the member from locking engagement with the lever. The mounting apparatus further includes a receiving portion extending from the second portion removably engaging the locking apparatus.

In one refinement of this aspect, the tab engages the member when the tab is in a locking position. In another refinement, the receiving portion defines a slot along the second portion of the bracket and the locking apparatus includes a spline extending therefrom that is removably received in the slot. The spline includes a notch and the second portion of the bracket includes a release button and a retaining pin connected to and movable with the release button. The retaining pin is spring-biased into the slot to engage the notch when the spline is positioned in the slot and the retaining pin is movable out of engagement with the notch when the release button is pressed.

Figure 8:
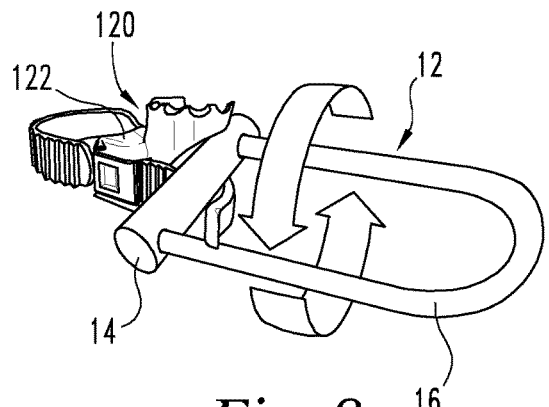
FIGS. 8 and 9 illustrate installation of a U-lock in the lock mounting assembly of FIG. 7.
Figure 9:
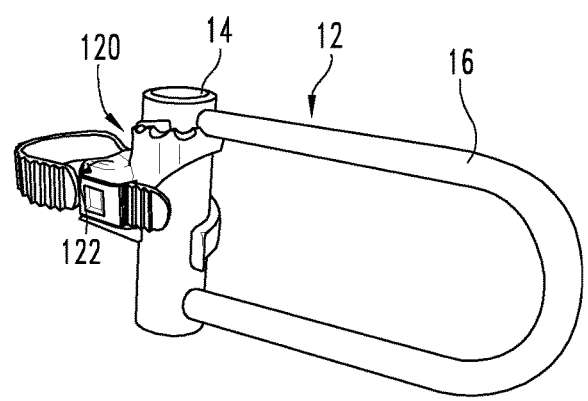
Figure 10:
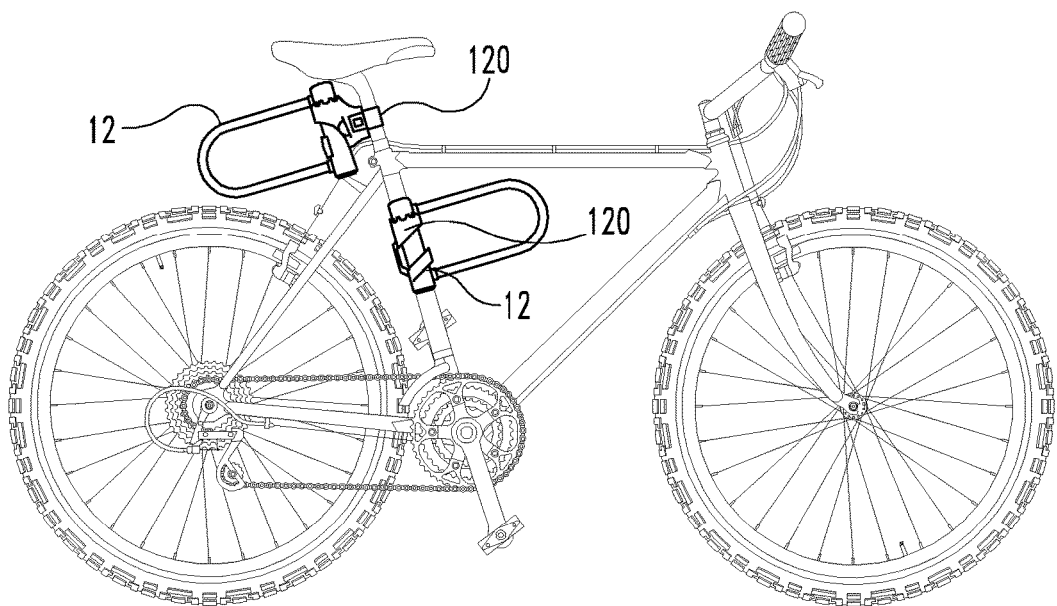
FIG. 10 is a side elevation view of a bicycle illustrating the lock mounting assembly of FIG. 7 mounted to the bicycle at exemplary locations.

Referring to FIGS. 7-11, a mounting assembly 120 in accordance with another exemplary embodiment of the invention will be described. FIG. 10 shows mounting assembly 120 attached to a bicycle frame at various positions with a U-lock 12 supported in the mounting assembly 120. The mounting assembly 120 generally comprises a bracket body 122, a strap 36 and a lever 40. The strap 36 and lever 40 operate in a manner similar to the previous embodiment discussed with respect to FIGS. 1-6.

The bracket body 122 includes a snap assembly 130 opposite the strap 36. The snap assembly 130 includes a pair of circumferential arms 132 and 134 each of which extends from the bracket body 122 over an arc greater than 180°, with the upper arm 132 extending counterclockwise and the lower arm 134 extending clockwise. The outer ends 132a, 134a of arms 132, 134 thus overlap one another so that when observed in a direction along a central axis CA the retaining area 131 defined by the arms 132 and 134 is completely encircled by the combination of arms 132, 134. Arms 132, 134 also define retaining area 131 along central axis CA with an inner diameter less than the outer diameter of the lock portion received therein. That is, the retaining area 131 is sized to snap fittingly receive and retain a portion of the lock 12, e.g. the housing 14 of the illustrated U-lock. One or both of the arms 132, 134 may be provided with a reinforcing member 135, for example, a metal reinforcement.

Figure 7:
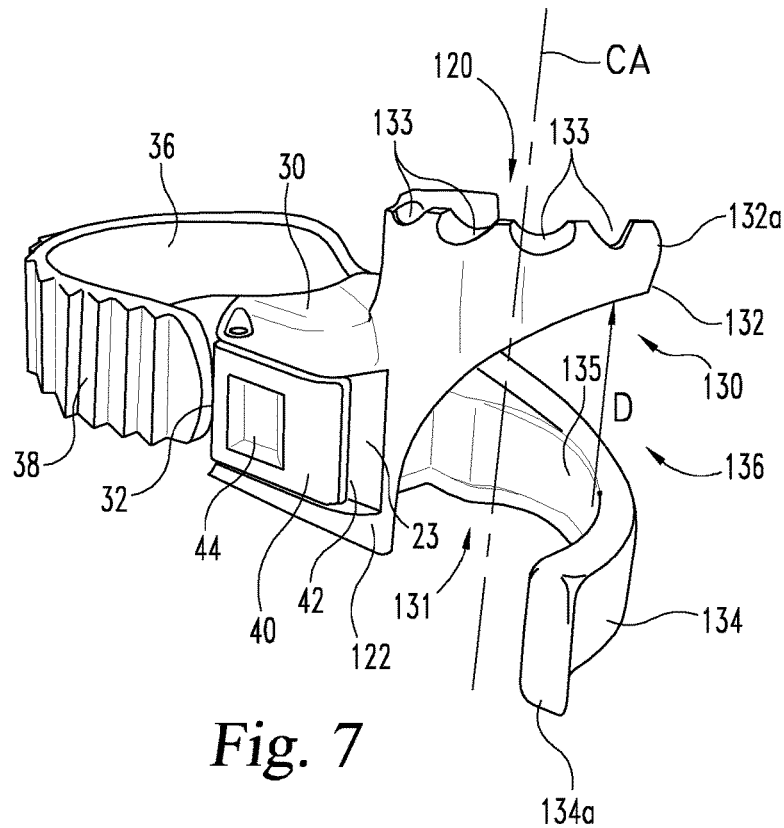
FIG. 7 is an isometric view of a lock mounting assembly in accordance with another exemplary embodiment of the invention.
Figure 11:
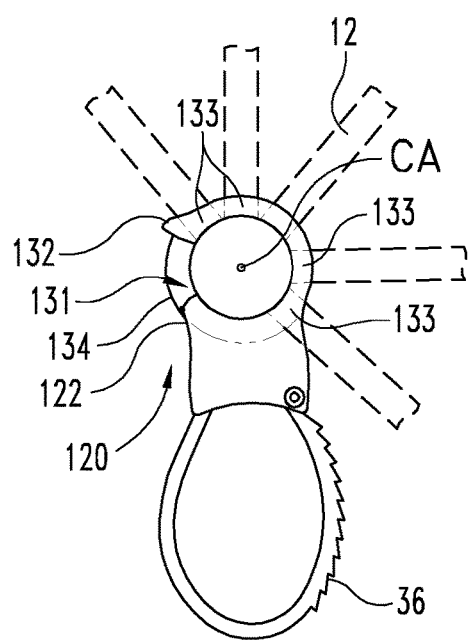
FIG. 11 is a top plan view of the lock mounting assembly of FIG. 7 with the lock illustrated in various rotational orientations.

As shown in FIG. 7, the upper and lower arms 132 and 134 are spaced from one another a distance D along central axis CA to define a receiving opening 136 obliquely oriented to central axis CA. As shown in FIGS. 8 and 9, the lock housing 14 is positioned at an oblique angle to axis to be received through the opening 136 and then rotated to a position with the housing 14 substantially parallel with the axis CA. As shown in FIGS. 7 and 11, in the illustrated embodiment, the upper arm 132 includes a series of upper end notches 133 configured to receive a portion of the lock 12, for example, the lock shackle 16, to stabilize the lock 14. The multiple notches 133 allow lock shackle 16 of the lock 12 to be positioned in various orientations to central axis CA, as shown in the section view of FIG. 11.

Figure 12:
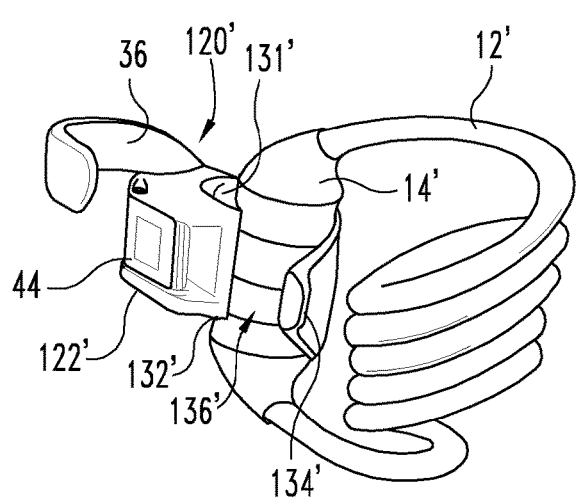
FIG. 12 is an isometric view of a lock mounting assembly in accordance with another exemplary embodiment of the invention.

Referring to FIG. 12, a mounting assembly 120' similar to the previous embodiment is illustrated. In the present embodiment, the arms 132' and 134' are not axially spaced from one another along central axis CA and do not overlap one another, but instead are in the same plane. The arms 132' and 134' are sized such that a receiving opening 136' into the retaining area 131' is defined between the arms 132' and 134'. As in the previous embodiment, the retaining area 131' is sized to snap fittingly receive and retain a portion of the lock 12', e.g. the housing 14' of the illustrated cable lock.

According to one aspect of the mounting assembly of FIGS. 7-12, a transportation device accessory includes a locking apparatus configured to secure the transportation device to an object and a mounting assembly mountable to the transportation device and to the locking apparatus. The mounting assembly includes a bracket with a member extending therefrom that is mountable to the transportation device. The mounting assembly also includes a receiving portion extending from the bracket removably engaging the locking apparatus. The receiving portion includes a first arm extending upwardly from a first side of the bracket and a second arm extending downwardly from a second side of the bracket opposite the first side. The first and second arms each further extend outwardly from the bracket to define a receiving area between the first and second arms and the bracket. The retaining area extends along a central axis along which the first and second arms are spaced a distance from one another. A portion of the locking apparatus is positioned along the central axis when secured in the retaining area by the first and second arms.

In one refinement of this aspect, the first and second arms each extend along an arc greater than 180 degrees to an outer end thereof so that the first and second arms overlap one another around the central axis. In another refinement, the first and second arms define a retaining area having a first diameter and the portion of the locking apparatus received in the retaining area defines a second diameter that is greater than the first diameter so that the portion of the locking apparatus snap fits into the first and second arms in the retaining area. In another refinement, the first and second arms define a receiving opening therebetween that is configured so that the portion of the locking apparatus must be positioned at an oblique angle to the central axis to be positioned through the receiving opening. In yet another refinement, the first arm defines a plurality of notches along an upper side thereof and to receive a second portion of the locking apparatus that is transverse to the first portion to secure the locking apparatus in an orientation determined by a position of the notch in which the second portion is positioned. In yet another refinement, the bracket includes a first portion movably connected to a second portion of the bracket, and the member includes a first end fixedly connected to a first side of the first portion of the bracket. The first portion of the bracket defines a channel opening along a second a second side of the first portion that is opposite the first side. The bracket further includes a lever pivotably mounted to the second side along the channel to define an opening for receiving a second end of the member that is opposite the first end. The lever is movable in locking engagement with the member in the channel to tighten the member around the transportation device. The bracket further includes a tab pivotably mounted to the lever that is movable relative to the lever and the member to release the member from locking engagement with the lever.

Figure 15A:
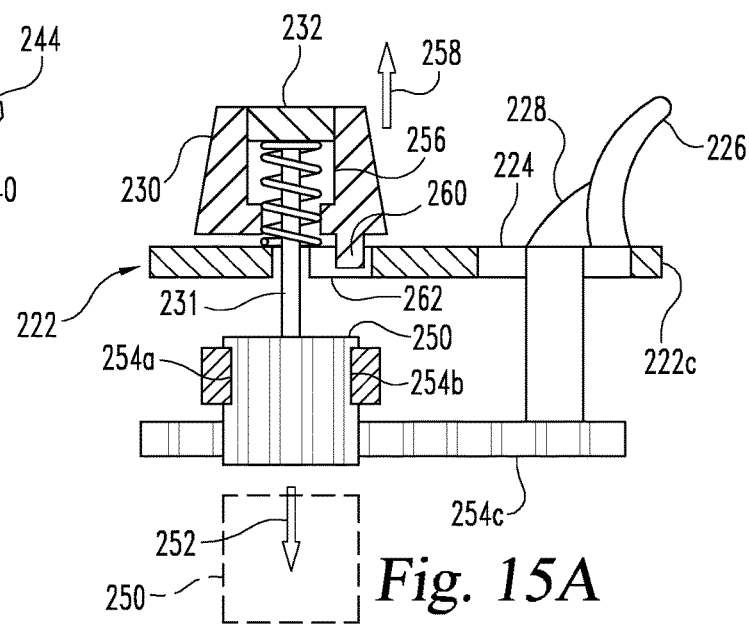
FIG. 15A is a sectional view showing one embodiment of a control knob, release button and actuation mechanism for the lock mounting assembly of FIG. 13.
Figure 15:
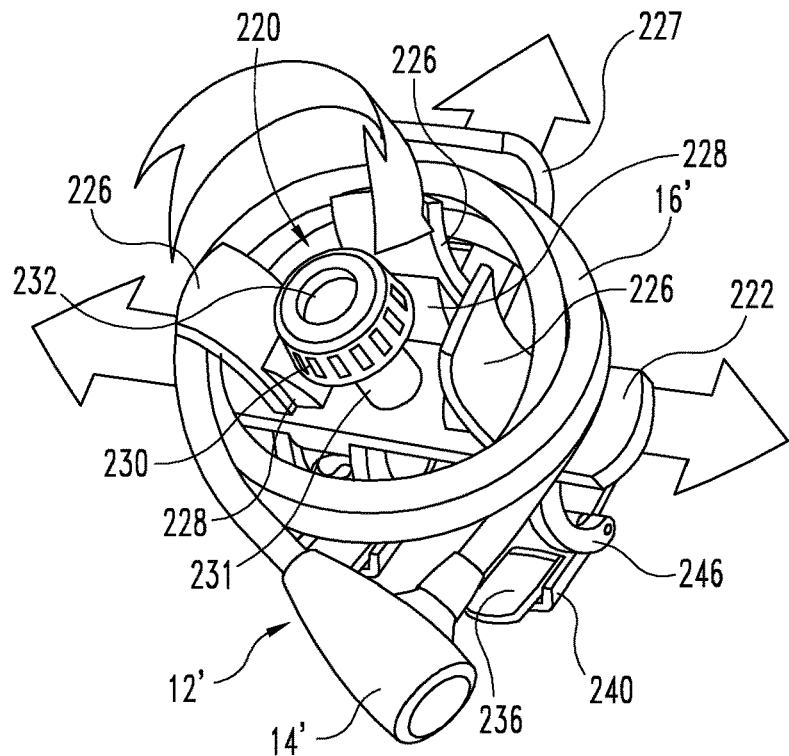
FIG. 15 is an isometric view of the lock mounting assembly of FIG. 13 in an unlocked position with an illustrative cable lock.
Figure 16:
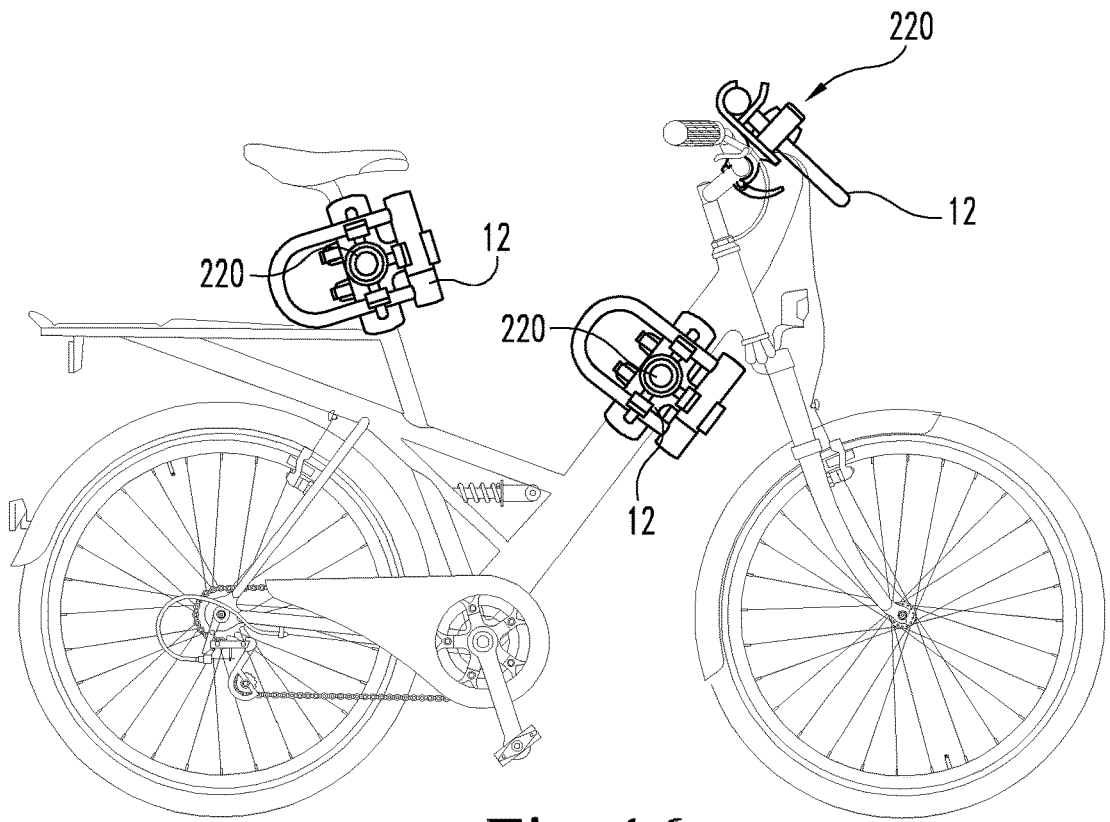
FIG. 16 is a side elevation view of a bicycle illustrating the lock mounting assembly of FIG. 13 mounted to the bicycle at exemplary locations.
Figure 17:
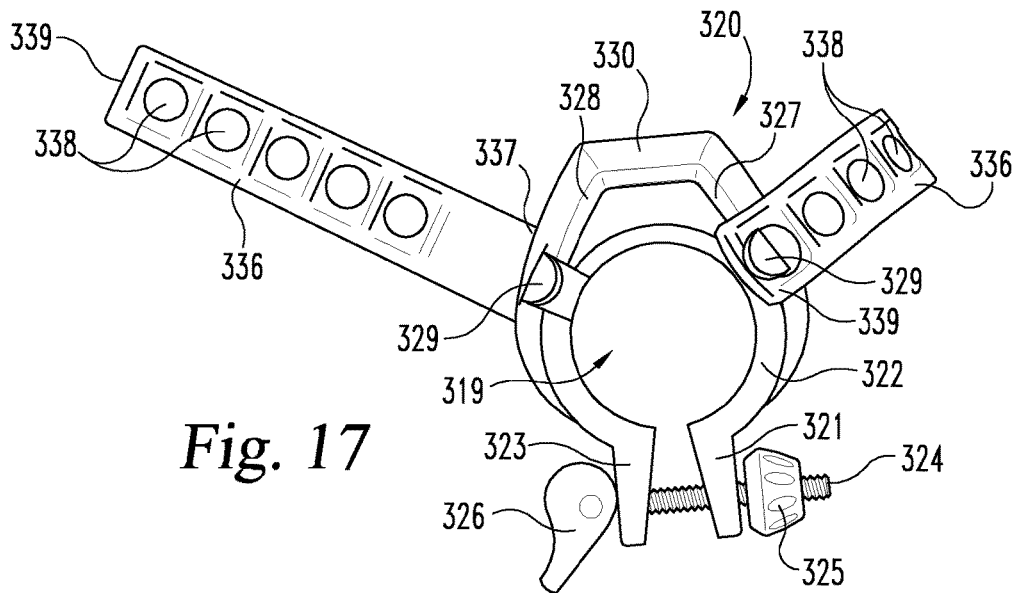
FIG. 17 is a plan view of a lock mounting assembly in accordance with another exemplary embodiment of the invention.

Referring to FIGS. 13-16, a mounting assembly 220 in accordance with another exemplary embodiment of the invention will be described. FIG. 16 shows mounting assembly 220 attached to a bicycle frame at various positions with a U-lock 12 supported in the mounting assembly 220. The mounting assembly 220 generally comprises a bracket body 222, moveable locking tabs 226, a control knob 230, a connection arm 246 and a pair of levers 240.

In the illustrated embodiment, the bracket body 222 is a T-shaped planer member defining three lobes 222a, 222b and 222c. Each lobe 222a, 222b and 222c supports a corresponding moveable locking tab 226. Lobe 222c also includes a fixed locking tab 227 at an end thereof opposite the moveable locking tab 226. The invention is not limited to the number or configuration of lobes and moveable or fixed locking tabs. Each moveable locking tab 226 includes a guide portion 228 which extends through a respective slot 224 in the bracket body 222. The guide portions 228 each engage an activation assembly such as, for example, a rack and pinion assembly, associated with the control knob 230 and shaft 231. Rotation of the control knob 230 and shaft 231 causes the moveable locking tabs 226 to move between the inward positions shown in FIG. 15 and the outward positions shown in FIG. 13. To prevent inadvertent movement of the tabs 226, the control knob 230 preferably includes a clutch mechanism or the like which prevents rotation of the control knob 230 unless a clutch release button 232 is depressed.

In one embodiment, control knob 230 is in splined or toothed engagement with the outer periphery of release button 232 but is slidable relative to button 232 along shaft 231. Pushing release button 232 as indicated by arrow 252 moves the shaft 231 and the pinion gear 250 connected at the end of shaft 231 out of engagement with rack gear teeth 254a, 254b, 254c extending along the respective lobe 222a, 222b, 222c and connected to respective ones of the locking tabs 226. A spring 256 connected to release button 232 normally biases the pinion gear 250 into engagement with the rack gear teeth 254a, 254b, 254c when release button 232 is released. Control knob 230 is pulled out as indicated by arrow 258 to release one or more locking splines 260 in the assembly that engages, for example, a respective one of one or more aligned slots 262 in bracket 222, and allow control knob 230 to turn and move locking tabs 226 inwardly and outwardly. Pushing release control knob 230 inwardly re-engages the spline 260 and locks control knob 230 from turning and locks tabs 226 in place.

Figure 13:
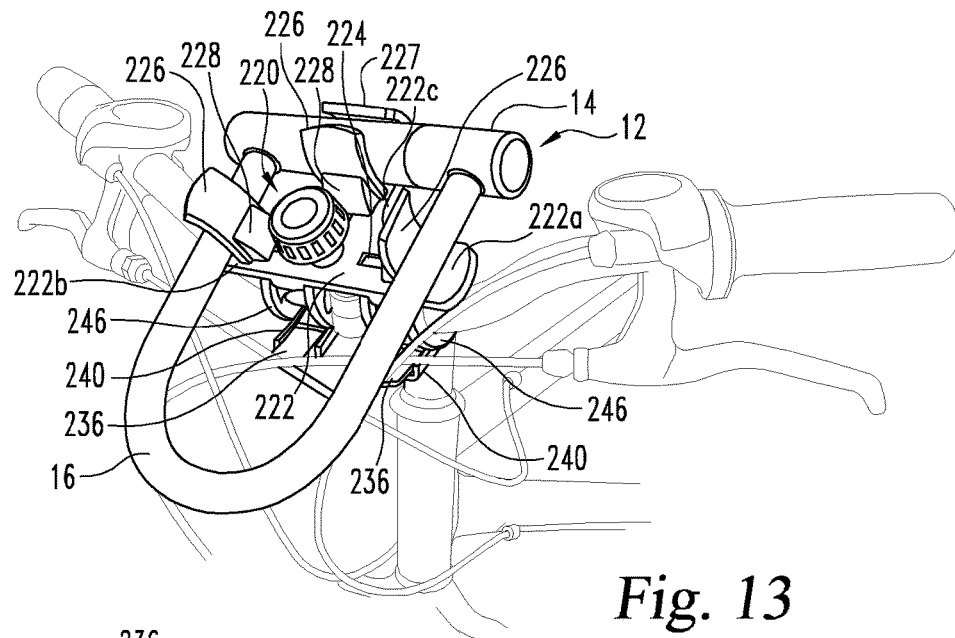
FIG. 13 is an isometric view of a lock mounting assembly in accordance with another exemplary embodiment of the invention in a locked position with an illustrative U-lock.
Figure 14:
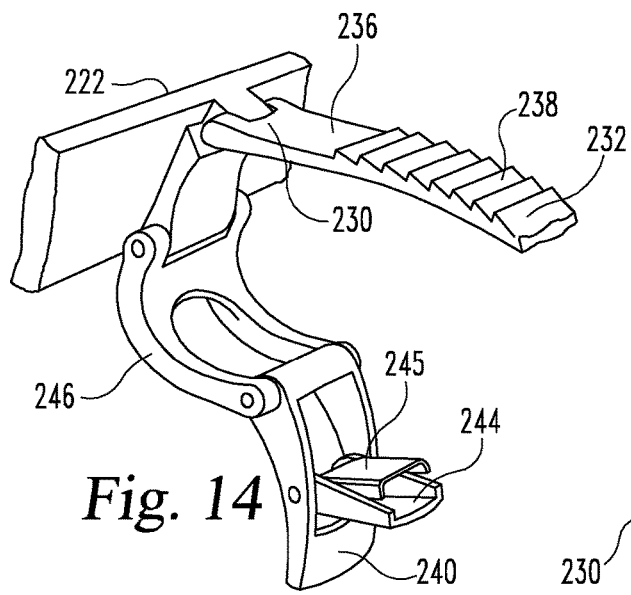
FIG. 14 is an isometric view of the connecting member of the lock mounting assembly of FIG. 13.

As shown in FIGS. 13 and 15, the tabs 226 and 227 are configured to engage the housing 14 and shackle 16 of the illustrated U-lock or to engage the cable 16' of the illustrated cable lock 12'. Other lock assemblies may also be supported.

To secure the bracket body 222 to a bicycle or the lock, a pair of straps 236 and levers 240 extends from the bottom of the bracket body 222. The strap 236 is connected at one end 230 to bracket body 22 and has an opposite free end 232. Ridges 238 are defined along one side of the strap 236. The lever 240 is pivotally supported to the bracket body 222 via a pivot connector 246. The lever 240 supports opposed tabs 244 and 245 which are pivotally connected to one another with a ratchet tooth (not shown) therebetween. The strap 236 is looped around a portion of the bicycle and the free end 232 is positioned between the tabs 244, 245 such that the internal ratchet tooth engages the ridges 238 and the strap 236 is maintained at an initial tension. The lever 240 is thereafter pivoted to a closed position (see FIGS. 13 and 15) such that the strap 236 is further tensioned to grip the portion of the bicycle or transportation device to which it is engaged.

According to one aspect of the mounting assembly of FIGS. 13-16, there is provided a transportation device accessory that includes a locking apparatus configured to secure the transportation device to an object and a mounting assembly mountable to the transportation device and to the locking apparatus. The mounting assembly includes a bracket including a body with a first lobe, a second lobe opposite the first lobe, and a third lobe offset from and between the first and second lobes. The first and second lobes each include a respective one of first and second locking tabs, and the third lobe includes a third locking tab. The first, second and third locking tabs are movable away from one another to an outward position to secure the locking apparatus to the mounting assembly. The first, second and third locking tabs are further movable toward one another to an inward position to release the locking apparatus from the mounting assembly. The mounting assembly also includes at least one connector extending from the bracket that is connectable to the transportation device to secure the mounting assembly to the transportation device.

In one refinement of this aspect, the connector includes a strap with a first end connected to the bracket and an opposite free end; a connection arm pivotably connected to the bracket and a lever pivotably connected to the connection arm opposite the bracket; and a first tab pivotably connected to the lever and a second tab pivotably connected to the first tab. The first and second tabs define an opening to receive the strap therethrough and the first and second tabs are pivotable relative to one another to selectively lock and release the free end of the strap relative to the bracket. In another refinement, the bracket includes a fixed tab on the third lobe and the third locking tab is movable toward the fixed tab to secure the locking apparatus therebetween in the outward position. In another refinement, the mounting assembly includes a control knob between the first, second and third locking tabs. The control knob is connected to a shaft extending through the bracket to an adjustment mechanism engaged to each of the first, second and third locking tabs. The control knob is rotatable in a first direction to move the first, second and third locking tabs to the outward position and the control knob is rotatable in a second direction opposite the first direction to move the first, second and third locking tabs to the inward position. The control knob houses a clutch release mechanism to release the control knob from a locked condition. In another refinement, the at least one connector includes a first connector and a second connector. The first connector is positioned along the first lobe and the second connector being positioned along the second lobe.

Figure 19:
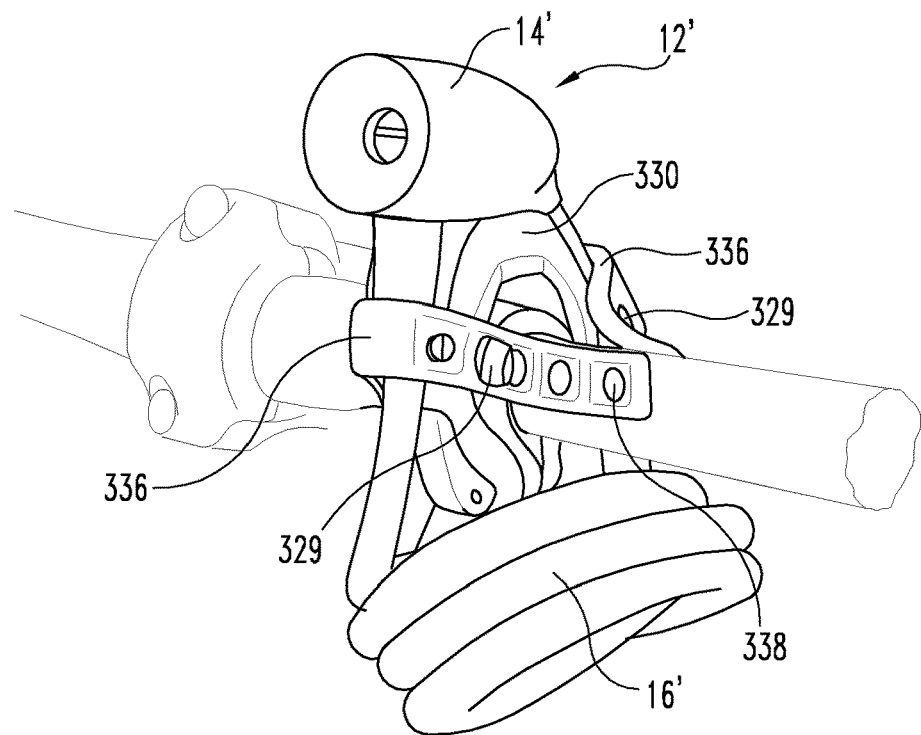
FIG. 19 is an isometric view of the lock mounting assembly of FIG. 17 mounted on a portion of a bicycle with an illustrative cable lock.
Figure 20:
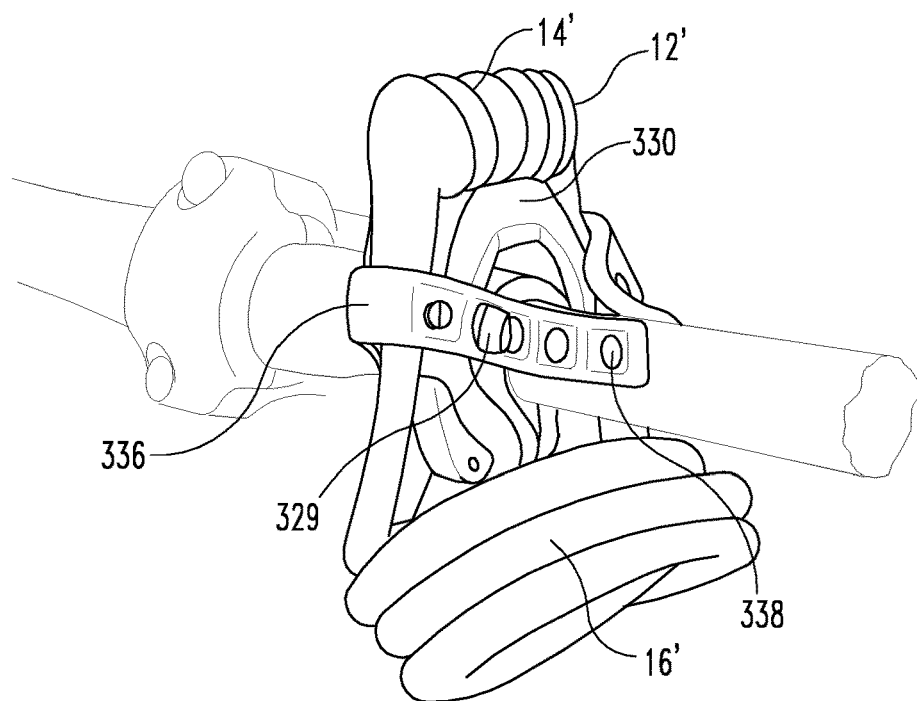
FIG. 20 is an isometric view of the lock mounting assembly of FIG. 17 mounted on a portion of a bicycle with another illustrative cable lock.
Figure 21:
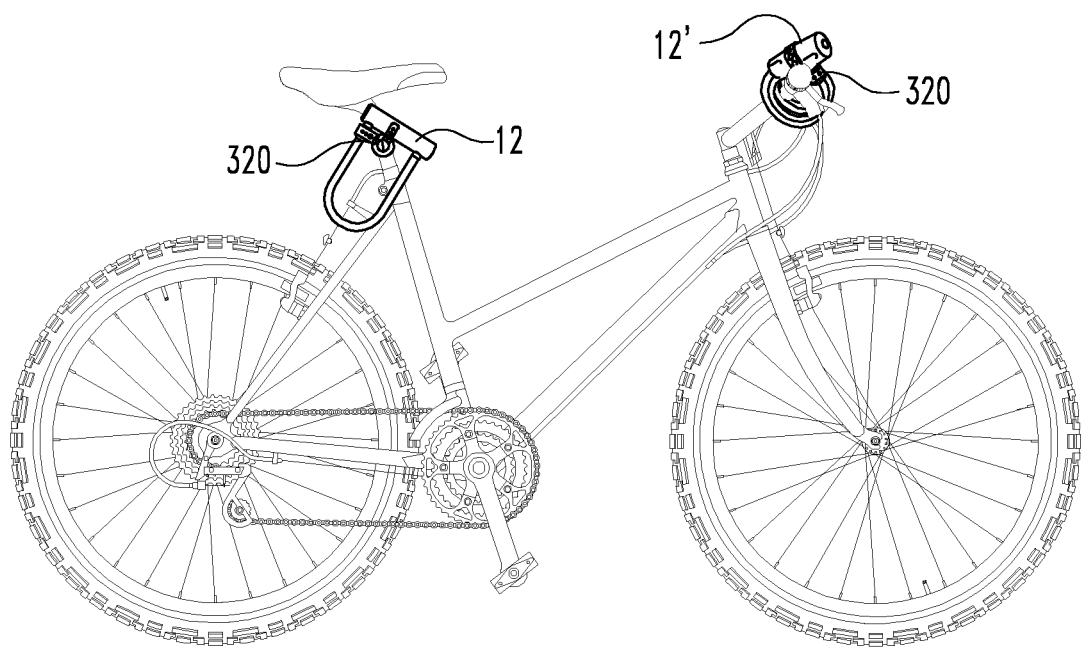
FIG. 21 is a side elevation view of a bicycle illustrating the lock mounting assembly of FIG. 17 mounted to the bicycle at exemplary locations.
Figure 21A:
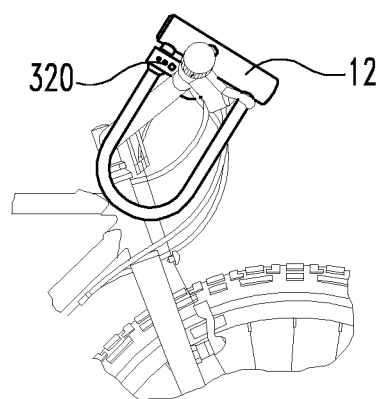
FIG. 21A shows a portion of the bicycle of FIG. 21 with an illustrative U-lock.

Referring to FIGS. 17-22, a mounting assembly 320 in accordance with another exemplary embodiment of the invention will be described. FIGS. 21 and 21A show mounting assembly 320 attached to a bicycle frame at various positions with a U-lock 12 or cable lock 12' supported in the mounting assembly 320. The mounting assembly 320 generally comprises a bracket body 322, a connection bolt 324, a grip surface 330, elastic straps 336 and strap connectors 329.

Figure 22:
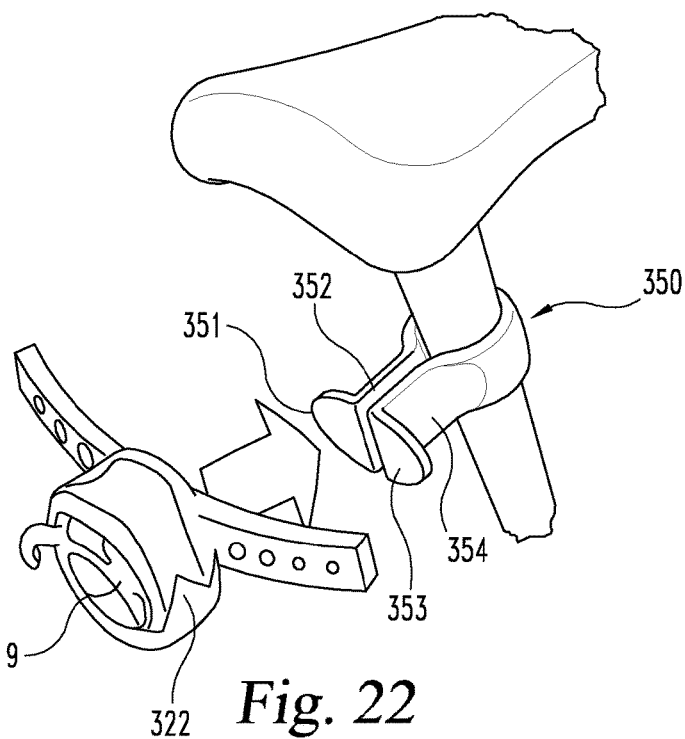
FIG. 22 is an isometric view of the lock mounting assembly of FIG. 17 mounted to the bicycle in an alternative manner.

The bracket body 322 defines a through hole 319 configured to receive a portion of the bicycle frame or the like. Opposed legs 321 and 323 extend from the bracket body 322 and support a connection bolt 324. A nut 325 is threadably secured to one end of the bolt 324 and the other end includes a cam member 326. The nut 325 is tightened against the leg 321 and then the cam 326 is moved to a locked position (see FIG. 18) to secure the bracket body 322. For portions of the bicycle having a smaller diameter, e.g. a seat post, an adapter 350 may be provided as illustrated in FIG. 22. The adapter 350 is positioned about the post with a pair of opposed legs 352 and 354 extending therefrom. Each leg 352, 354 has a respective outward flange 351, 353. The legs 352, 354 and flanges 351, 353 are received through the through hole 319 and then the nut 325 and cam 326 are secured such that the through hole 319 diameter is less than the outer diameter of the flanges 351, 353. Adapter 350 may be used to mount the bracket of any of the embodiments disclosed herein to a portion of the transportation device. For example, first portion 22A of the bracket 22 in FIG. 2 can be provided with a bore to receive legs 352, 354 of bracket 22 therein in lieu of strap 36.

A flexible support of resilient material is positioned about a portion of the bracket body 322 to define a grip surface 330. Flexible supports 327 and 328 preferably extend from the bracket body 322 to support the grip surface 330 of the support spaced from the bracket body 322 over a portion of the grip surface 330. A pair of elastic straps 336 extends from the bracket body 322 from a fixed end 337 to a free end 339. While two straps 336 are shown, the invention is not limited to such and may include more or fewer. Each strap 336 includes a series of retaining openings 338 spaced along a length of the respective strap from its free end 339 towards fixed end 337 that are configured to engage a respective retaining post 329 extending from the bracket body 322.

Figure 18:
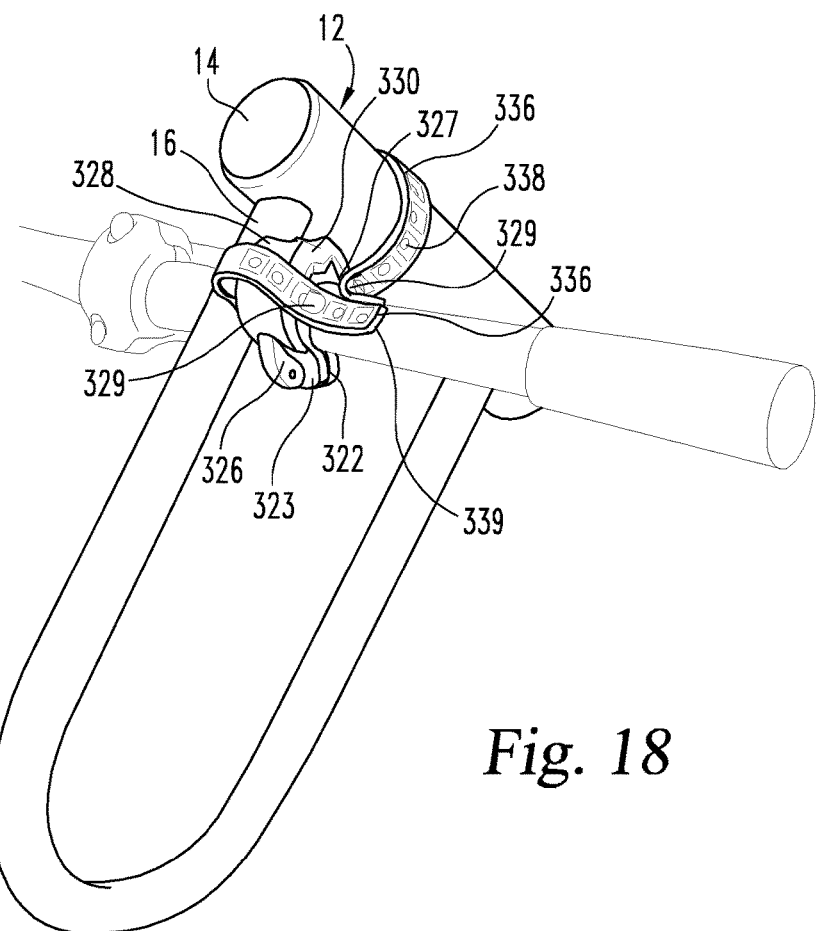
FIG. 18 is an isometric view of the lock mounting assembly of FIG. 17 mounted on a portion of a bicycle with an illustrative U-lock.

As shown in FIGS. 18-20, to retain a lock 12, 12', each strap 336 is looped about a portion 14, 16, 14', 16' of the lock 12, 12' and secured to a respective retaining post 329 via a selected one of the retaining openings 338 that provides the desired fit. The flexible supports 327 and 328 allow the grip surface 330 to flex if necessary as tension is applied to the lock 12, 12' via the straps 336.

In one aspect of the mounting assembly of FIGS. 17-22, a transportation device accessory includes a locking apparatus configured to secure the transportation device to an object and a mounting assembly mountable to the transportation device and to the locking apparatus. The mounting assembly includes a bracket releasably engageable to the transportation device having first and second connectors extending outwardly therefrom. The mounting assembly also includes a flexible support engaged to and extending from opposite sides of the bracket member. The flexible support includes a portion that is spaced from the bracket body between the opposite sides. The mounting assembly also includes first and second straps each having a fixed end secured to the flexible support along the portion thereof. The first and second straps each have a free end opposite the fixed end. The first and second straps are positioned around respective portions of the locking apparatus in engagement with a respective one of said first and second connectors to mount the locking apparatus to the transportation device.

In one refinement of this aspect, each of the first and second straps further includes a plurality of holes extending therethrough that are spaced along the strap from the free end toward the fixed end. Each of the first and second connectors is positionable in a selected one of the plurality of holes of the respective one of the first and second straps to secure the locking apparatus with the mounting assembly. In another refinement, the bracket defines a through-hole for receiving a portion of the transportation device therein and a pair of legs along one side of the bracket defines a gap therebetween. The mounting assembly also includes a connection member extending through the pair of legs and a cam member operable to move the pair of legs toward one another to clampingly engage the bracket to the portion of the transportation device. In another refinement, an adapter is positionable around a portion of the transportation device. The adapter includes a pair of legs extending outwardly therefrom with a flange at an end of each leg. The bracket defines a through-hole positioned around the pair of legs to grippingly engage the adapter with the portion of the transportation device and with the flanges retaining the bracket on the pair of legs.

Figure 24:
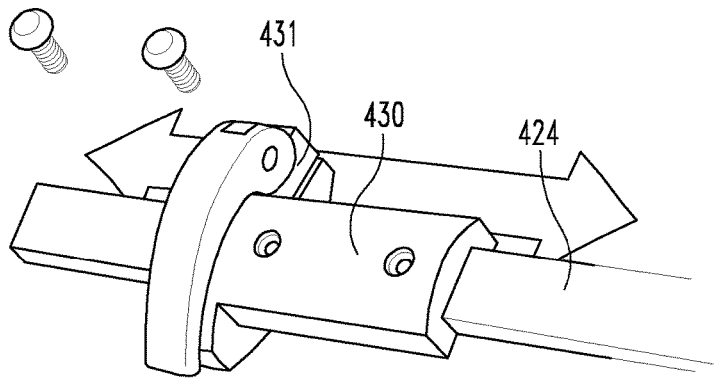
FIG. 24 is an isometric view of a portion of the slide of the lock mounting assembly of FIG. 23.
Figure 25:
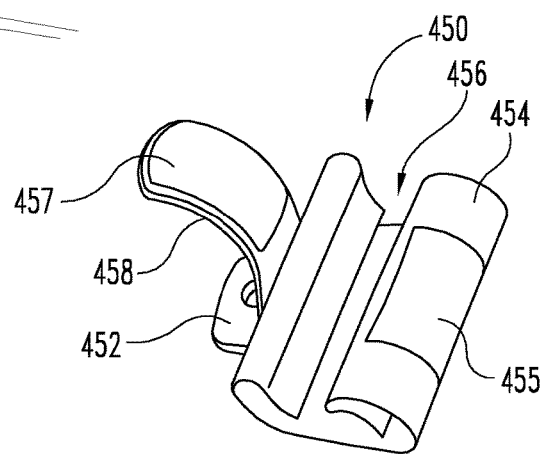
FIG. 25 is an isometric view of a bracket member of the lock mounting assembly of FIG. 23.
Figure 26:
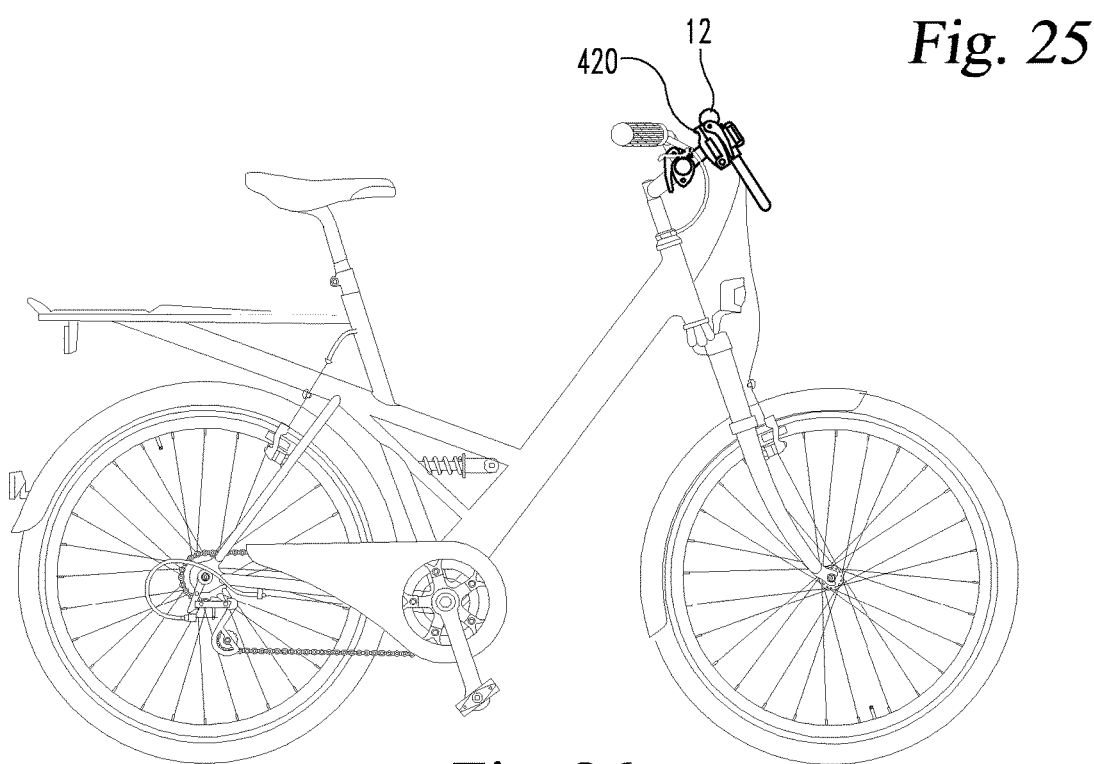
FIG. 26 is a side elevation view of a bicycle illustrating the lock mounting assembly of FIG. 23 mounted to the bicycle with a U-lock.

Referring to FIGS. 23-28, a mounting assembly 420 in accordance with another exemplary embodiment of the invention will be described. FIG. 26 shows mounting assembly 420 attached to a bicycle frame with a U-lock 12 supported in the mounting assembly 420. The mounting assembly 420 generally comprises a bracket body 422 and a pair of connection members 440 and 450.

The bracket body 422 includes a planar bar 424 which is supported by one or more support posts 426. In the illustrated embodiment, each support post 426 is connected to the bar 424 via a cam locking member 425. Cam locking members 425 are operable to release bar 424 so that bar 424 can be adjusted in longitudinal position relative to support posts 426 to provide a desired fit with the transportation device and then locked in the selected position with cam locking members 425. The opposite end of each support post 426 is connected to a portion of the bicycle via cam locking members 427 so that bracket body 422 is located on a forward side of the handle bars away from the rider. Other connection mechanisms may alternatively be utilized, such as the strap mechanisms described herein.

An angled bracket member 440 is supported adjacent one end of the bar 424. The angled bracket member 440 includes a flat portion 442 configured to be positioned against the bar 424 and secured thereto, for example, via the cam locking member 425. An angled portion 443 extends from the flat portion 442 away from the bar 424 such that a receiving area 441 is defined between the angled portion 443 and the bar 424. A free end of the angled bracket member 440 preferably defines a notch 444 configured to receive and retain an elastic strap 445 (see FIG. 27) extending between the notch 444 and a retainer 423 on the bar 424. The receiving area 441 is configured to receive a portion 16, 16' of the lock 12, 12' while the strap 445 maintains bracket member 400 in engagement with the locking apparatus. In one embodiment, cam locking members 425, 427, 431 are similar to a quick release mechanism and apply tension when closed to hold, for example, connection members 440, 450 in place along bar 424 of bracket body 422. Pulling back on the lever of the cam locking members allows connection members 440, 450 to slide inwardly and/or outwardly along bar 424 of bracket body 422. Teeth or other structures may be provided on one or both of the cam locking members and bar 424 to provide additional locking engagement.

Figure 23:
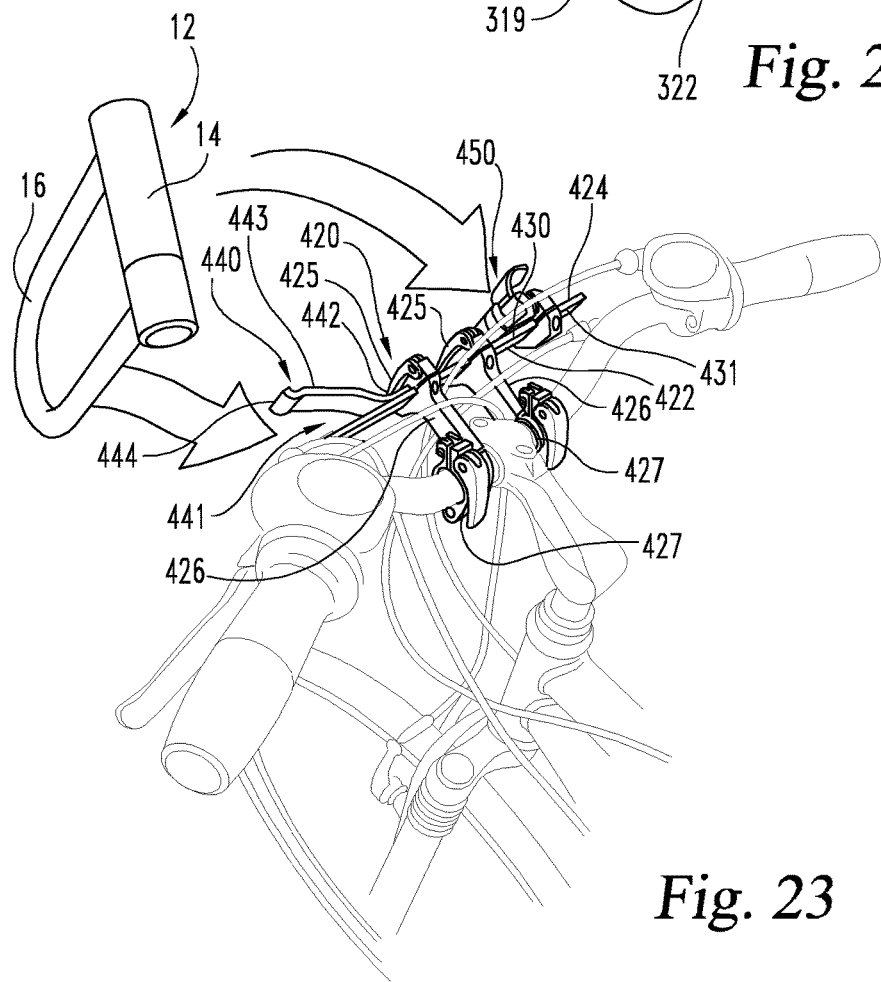
FIG. 23 is an isometric view of a lock mounting assembly in accordance with another exemplary embodiment of the invention illustrating connection of a U-lock.

Referring to FIGS. 23 and 24, a sliding block 430 is slidably secured via a cam locking member 431 on the bar 424. The sliding block 430 supports the second bracket member 450, 450' such that the position of the second bracket member 450, 450' may be adjusted along the bar 424.

Bracket member 450 is illustrated in FIG. 25 and includes an attachment plate 452 configured for attachment to the sliding block 430. A lock receiving member 454 is secured to the plate 452. In the present embodiment, the lock receiving member 454 is a flexible element defining a receiving area 456 configured to receive and retain a portion 14 of the lock 12. A strap 458 may also be provided on the lock receiving member 454 and configured to be secured across the receiving area 456 to further secure the lock 12. In the illustrated embodiment, the strap 458 and lock receiving member 454 have complimentary attachment pads 455, 457, e.g. hook and loop attachment pads, to secure the strap 458.

Figure 27:
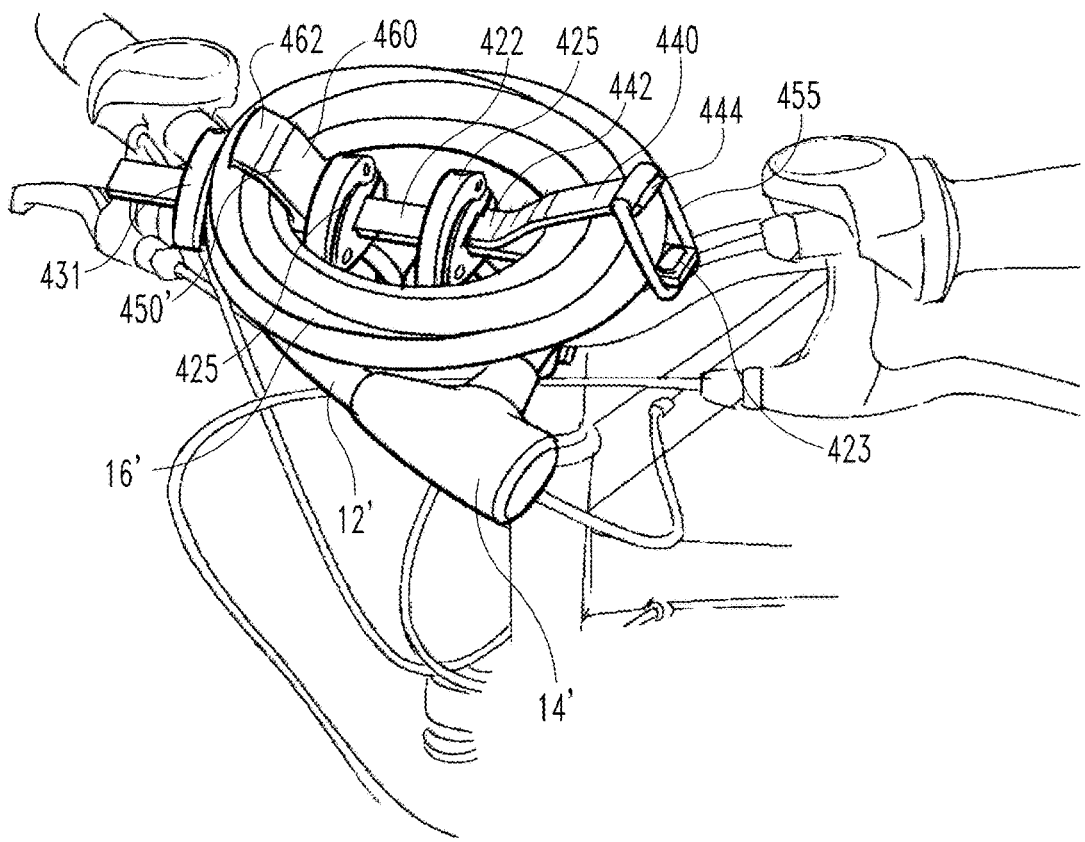
FIG. 27 is an isometric view of a portion of a bicycle illustrating the lock mounting assembly of FIG. 23 mounted to the bicycle with a cable lock.
Figure 28:
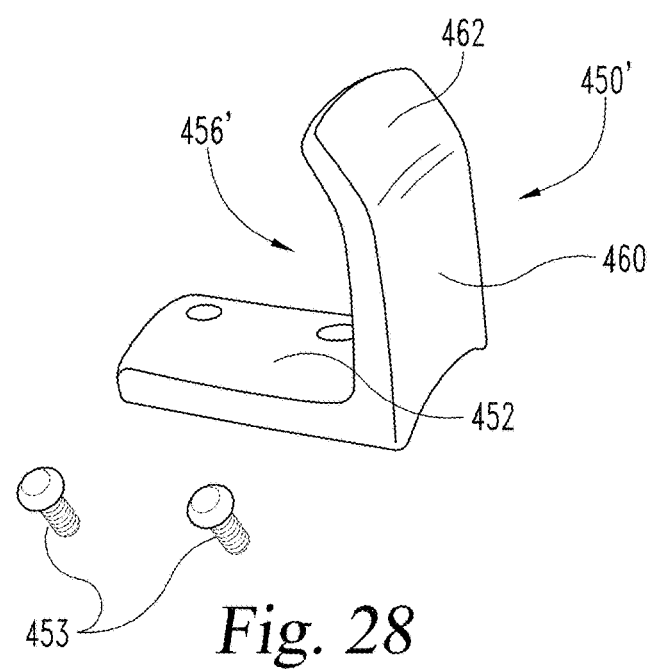
FIG. 28 is an isometric view of an alternative bracket member of the lock mounting assembly of FIG. 23.
Figure 29:
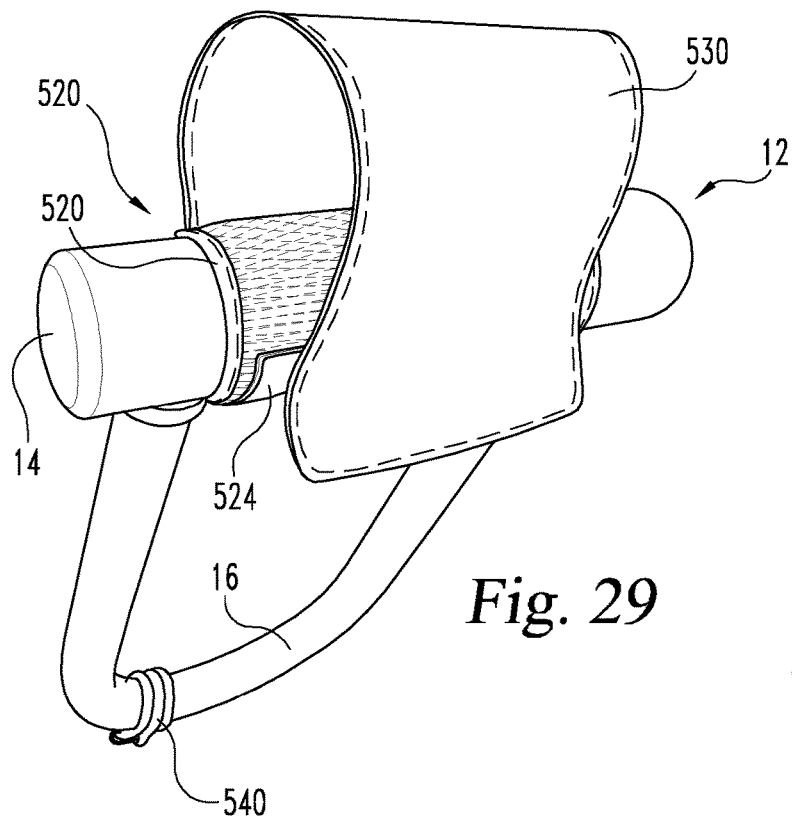
FIGS. 29 and 29A are isometric views of a lock mounting assembly in accordance with another exemplary embodiment of the invention illustrating connection of a U-lock.
Figure 29A:
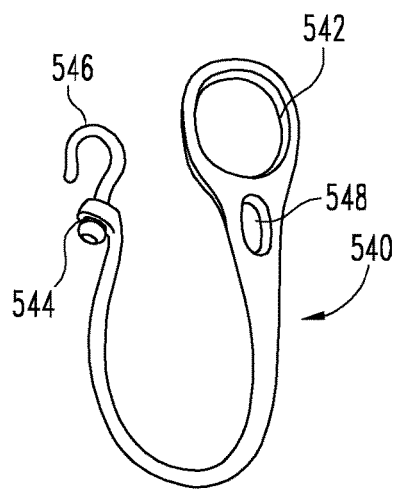

An alternate bracket member 450' is illustrated in FIGS. 27 and 28. The bracket member 450' includes an attachment plate 452 configured for attachment to the sliding block 430. A retaining member 460 extends substantially perpendicularly from the plate 452 and includes an angled portion 462 such that a retaining area 456' is defined between the plate 452 and the retaining member 460. As shown in FIG. 27, the retaining area can receive and retain, for example, cable portion 16' of cable lock 12' and the slidable bracket member 450' is adjustable along bar 424 to provide a spacing between bracket member 440 and bracket member 450' that provides a desired fit with the locking apparatus.

According to one aspect of the mounting assembly of FIGS. 23-28, a transportation device accessory includes a locking apparatus configured to secure the transportation device to an object and a mounting assembly mountable to the transportation device and to the locking apparatus. The mounting assembly includes an elongated bracket body and a pair of support posts extending from the bracket body. Each of the support posts includes a locking member removably engageable with the transportation device. The mounting assembly also includes a first connection member mounted to the bracket body toward a first end of the bracket body. The first connection member extends outwardly from the bracket body. The mounting assembly also includes a second connection member mounted to the bracket body. The second connection member extends from the bracket body along an angled portion to an outer end that is spaced from the bracket body to define a receiving area between the second connection member and the bracket body. A first end portion of the locking apparatus is positioned in the receiving area with an opposite second end portion of the locking apparatus positioned in engagement with the first connection member to secure the locking apparatus to the mounting assembly.

In one refinement of this aspect, the first connection member is slidingly adjustable in position along the bracket body to adjust a spacing between the first and second connection members. The first connection member may also include a pad defining a second receiving area for receiving the second end portion of the locking apparatus and an attachment strap extending from one side of the attachment pad that is closeable over the receiving area for releasable engagement with an opposite side of the attachment pad. In another refinement, the first connection member includes a retaining member extending outwardly from a sliding block of the first connection member that is slidable along the elongated bracket body. The retaining member defines a retaining area for receiving a portion of the locking apparatus therearound.

Figure 31:
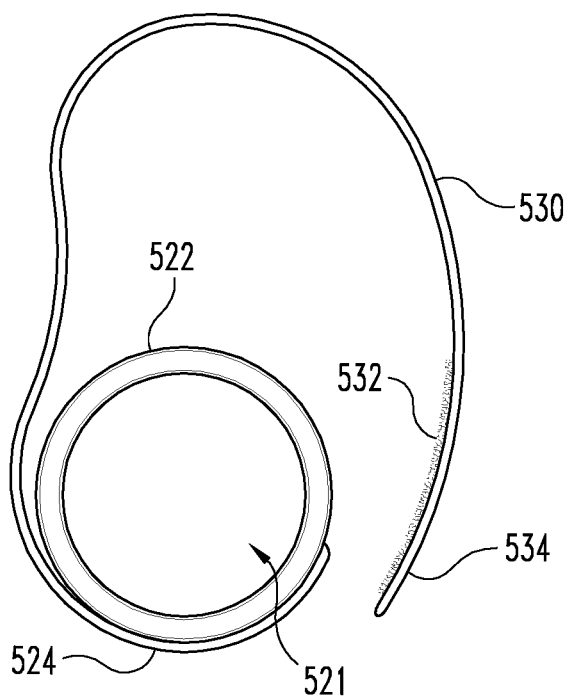
FIG. 31 is an elevation view of the lock mounting assembly of FIG. 29.
Figure 32:
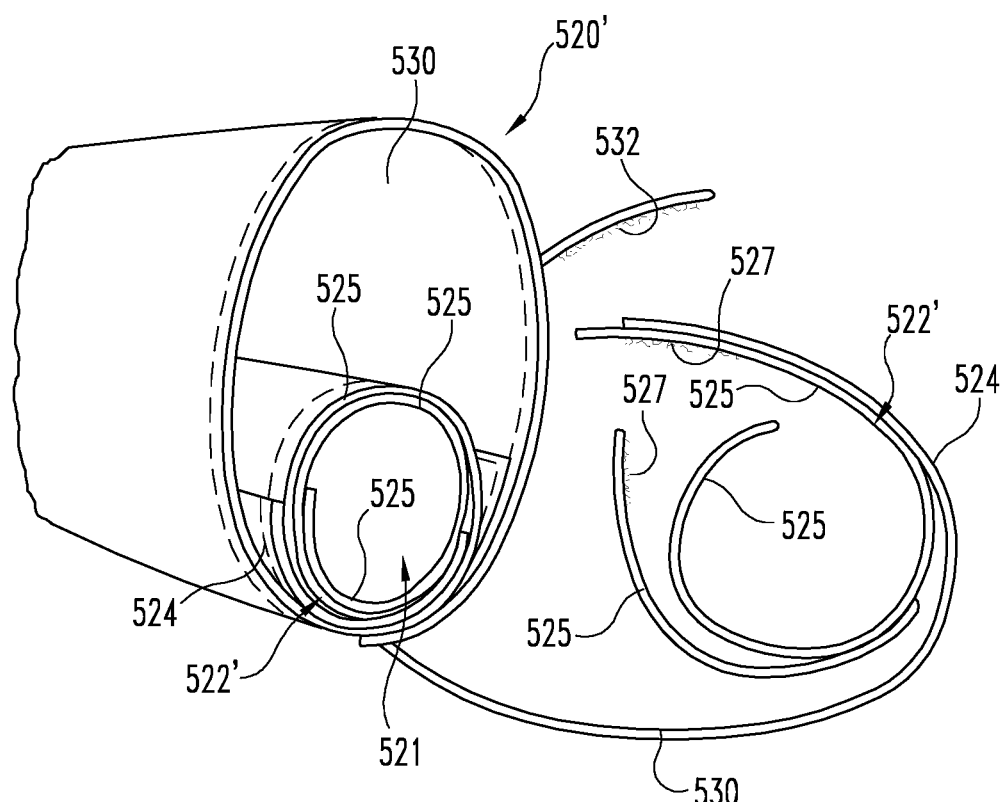
FIG. 32 is an isometric view illustrating an alternative configuration of the lock mounting assembly of FIG. 29.
Figure 33:
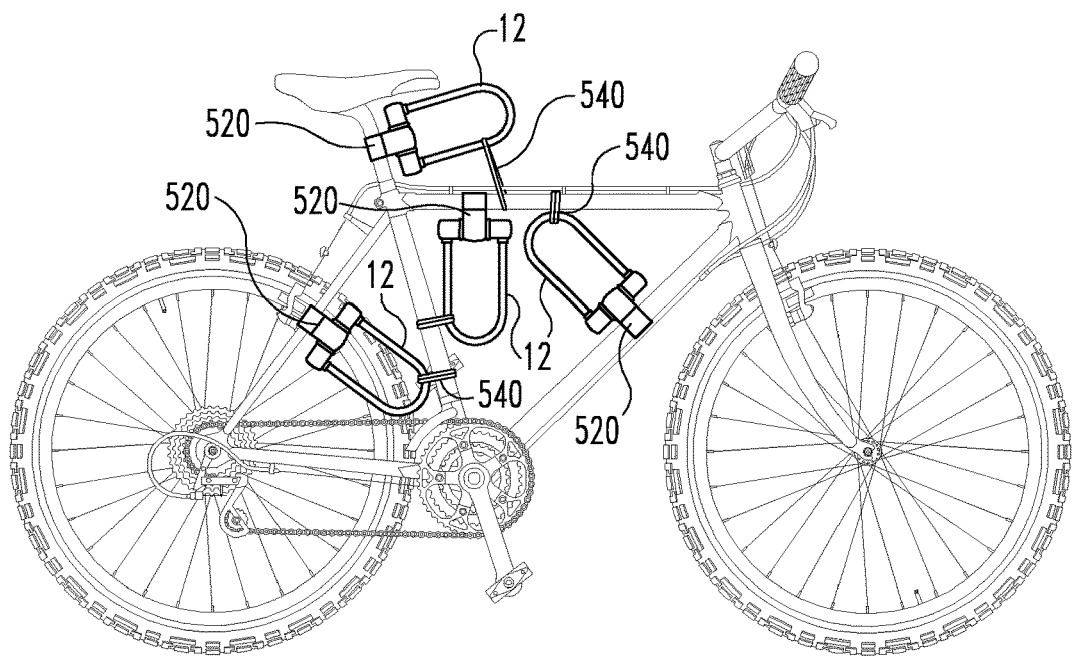
FIG. 33 is a side elevation view of a bicycle illustrating the lock mounting assembly of FIG. 23 mounted to the bicycle at exemplary locations.

Referring to FIGS. 29-33, a mounting assembly 520 in accordance with another exemplary embodiment of the invention will be described. FIG. 33 shows mounting assembly 520 attached to a bicycle frame at various locations with a U-lock 12 supported in the mounting assembly 520. The mounting assembly 520 generally comprises a sleeve body 522 and a securement strap 530.

Figure 30:
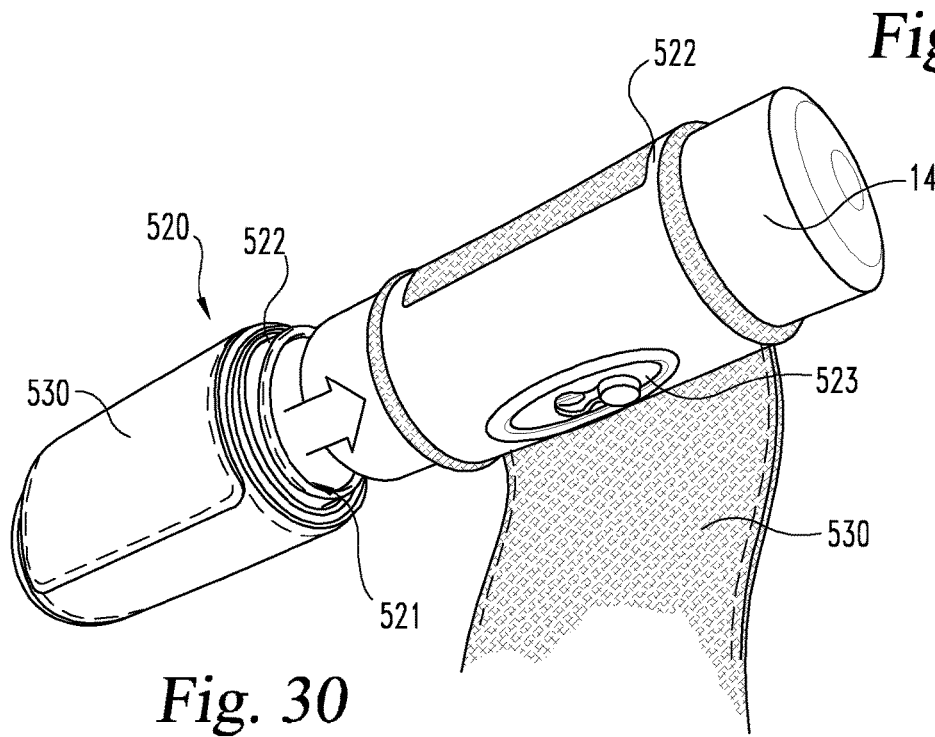
FIG. 30 is a partially exploded view illustrating positioning of the lock mounting assembly of FIG. 29 on a U-lock.

The sleeve body 522 includes a tubular member manufactured, for example, from a foam or elastic material. The sleeve body 522 defines a through passage 521 configured to receive a portion of the lock 12, for example, the housing 14 of the illustrated U-lock. The sleeve body 522 may define an aperture 523 which aligns with a key hole or the like as illustrated in FIG. 30. The sleeve body 522 may have a continuous perimeter as illustrated in FIG. 31 or may be adjustable as illustrated in FIG. 32. In the embodiment of FIG. 32, the sleeve body 522' is defined by a plurality of materials layers 525 with attachment means 527, for example, hook and loop fasteners, such that the layers 525 may be connected in various configurations to define different diameters of the through passage 521.

The securement strap 530 extends from the sleeve body 522 to a free end 534. An attachment pad 532 is provided along the strap 530 proximate the free end 534. The attachment pad 532 is configured to attach to an attachment area 524 along the sleeve 522. The attachment pad 532 and attachment area 524 may utilize hook and loop fasteners or any other fastening mechanism. To secure the lock 12, the strap 530 is looped around a portion of the bicycle and then secured via the attachment pad 532 attached to attachment area 524. Attachment area 524 may cover a relatively large area of sleeve 524 to provide multiple attachment locations and adjustability for strap 30 to be fitted around the portion of the transportation device to which the locking apparatus is to be mounted.

To further stabilize the lock 12, the mounting assembly 520 may further include a secondary strap 540 configured to be secured to another portion of the lock, for example, the shackle 16. In the illustrated embodiment, the secondary strap 540 is an elastic member with a through hole 542 at one end and configured to receive the shackle 16. The opposite end 544 of the strap 540 includes a hook 546 configured to be secured in receiving opening 548. Other configurations, for example, a hook and loop strap, may also be utilized.

According to one aspect of the mounting assembly of FIGS. 29-33, there is disclosed a transportation device accessory including a locking apparatus configured to secure the transportation device to an object and a mounting assembly mountable to the transportation device and to the locking apparatus. The mounting assembly includes a sleeve body defining a passage for receiving a portion of the locking apparatus therethrough. The mounting assembly further includes a securement strap extending from the sleeve body to a free end. The securement strap includes an attachment pad along at least one side thereof adjacent the free end so that the securement strap is positionable around a portion of the transportation device with the attachment pad being releasably engaged to a receiving pad on the sleeve body to secure the mounting assembly and the locking apparatus to the transportation device.

In one refinement of this aspect, the transportation device accessory includes a second strap positioned in engagement with the locking apparatus opposite the portion of the locking apparatus received in the sleeve body. The second strap is also engaged to the transportation device. In another refinement, the sleeve defines an aperture therethrough opening into the passage that aligns with a keyway on the locking apparatus.

Figure 34:
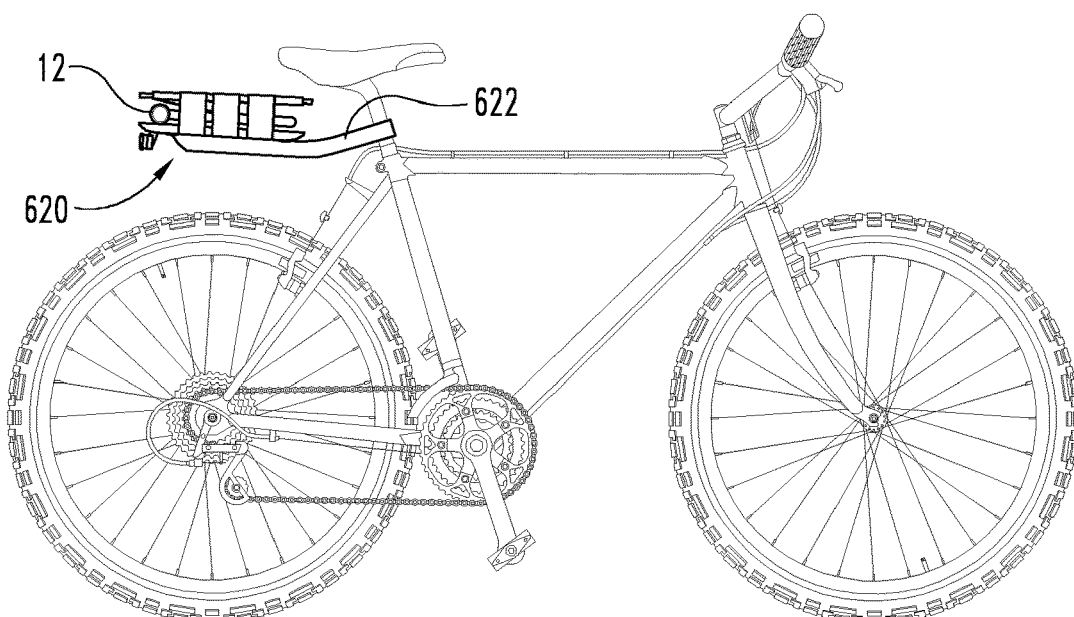
FIG. 34 is a side elevation view of a bicycle illustrating a lock mounting assembly of another exemplary embodiment of the invention mounted to a bicycle with a U-lock.
Figure 35:
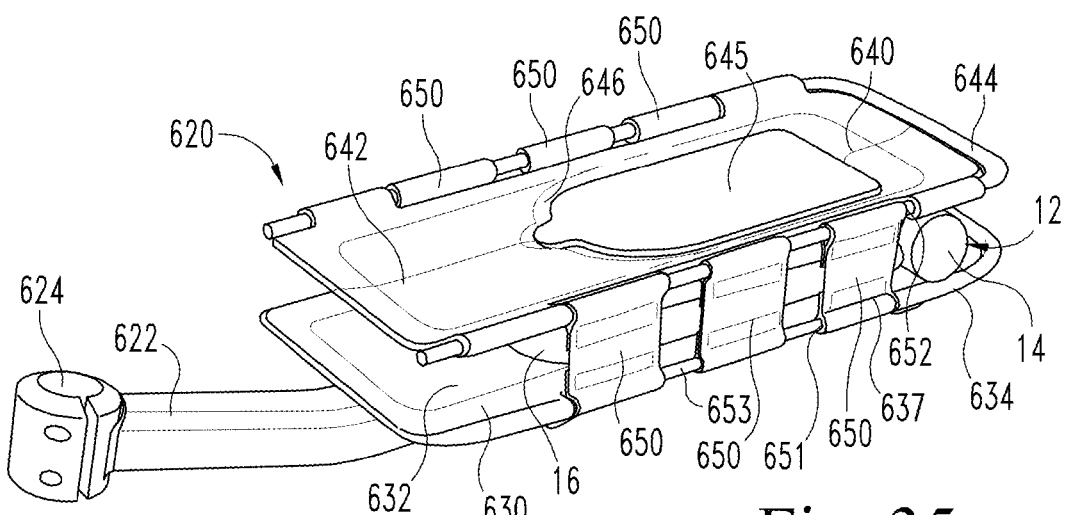
FIG. 35 is a front isometric view of the lock mounting assembly of FIG. 34.

Referring to FIGS. 34-38, a mounting assembly 620 in accordance with another exemplary embodiment of the invention will be described. FIG. 34 shows mounting assembly 620 attached to a bicycle frame with a U-lock 12 supported in the mounting assembly 620. The mounting assembly 620 generally comprises a support bar 622, opposed support surfaces 630 and 640 and straps 650 extending between the surfaces.

Figure 37:
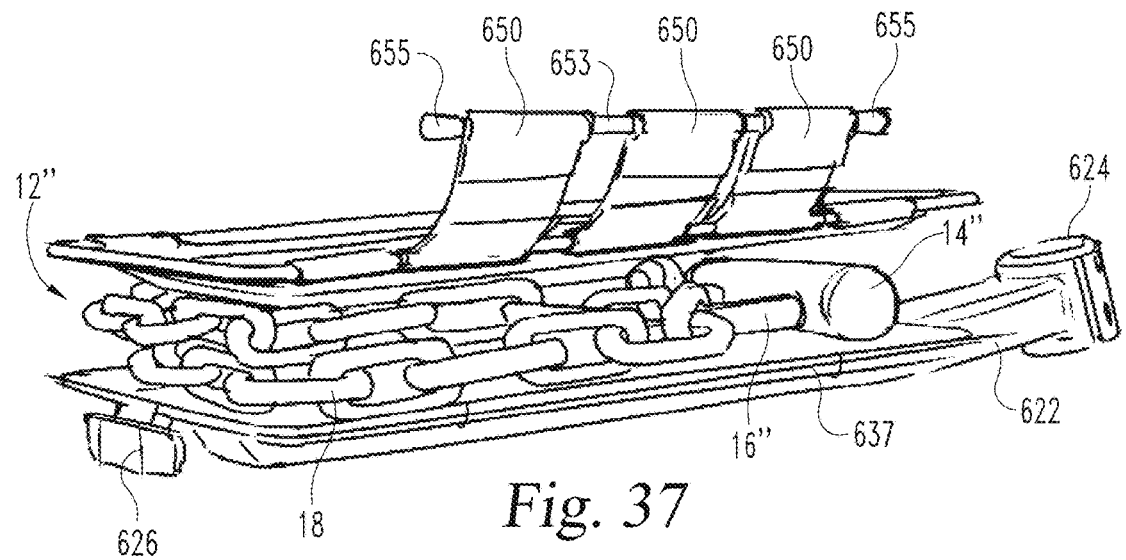
FIG. 37 is a rear isometric view of the lock mounting assembly of FIG. 34 with a side support partially open and with a chain lock.
Figure 38:
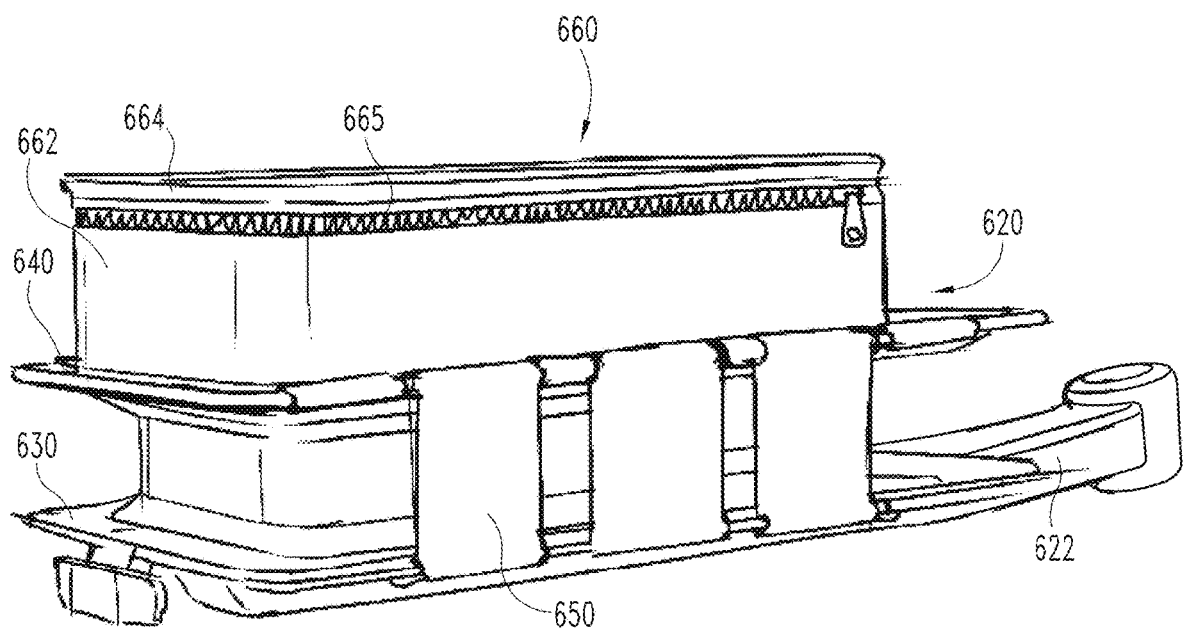
FIG. 38 is a rear isometric view of the lock mounting assembly of FIG. 34 with an optional bag attached thereto.
Figure 39:
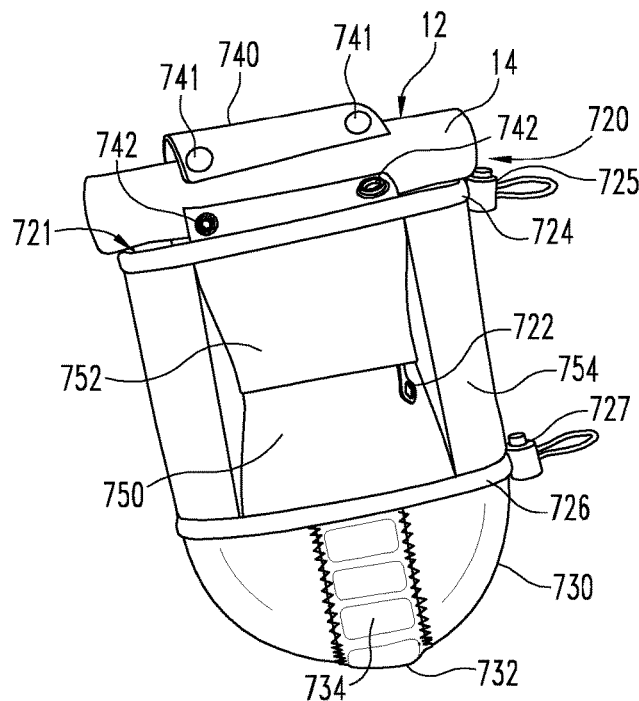
FIG. 39 is a front elevation view of a lock mounting assembly in accordance with another exemplary embodiment of the invention with a U-lock.
Figure 40:
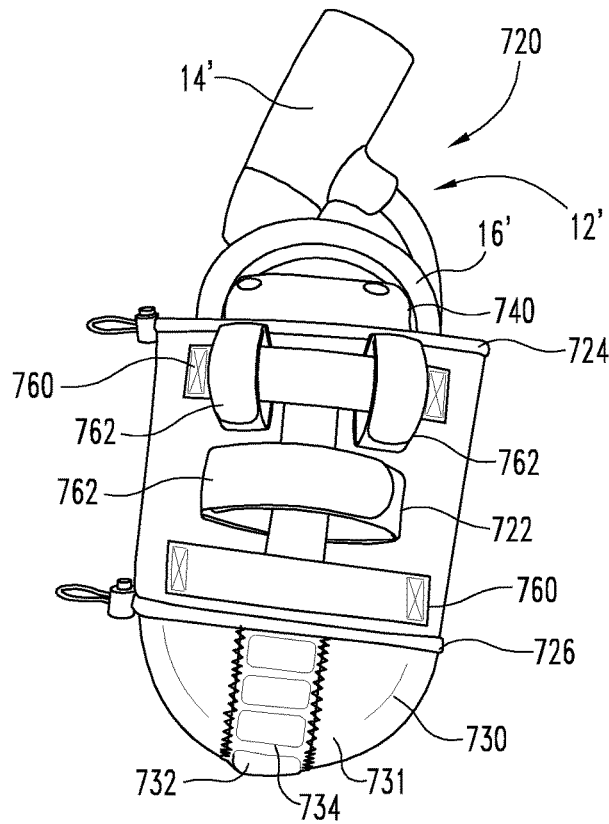
FIG. 40 is a rear elevation view of the lock mounting assembly of FIG. 39 with a cable lock.
Figure 41:
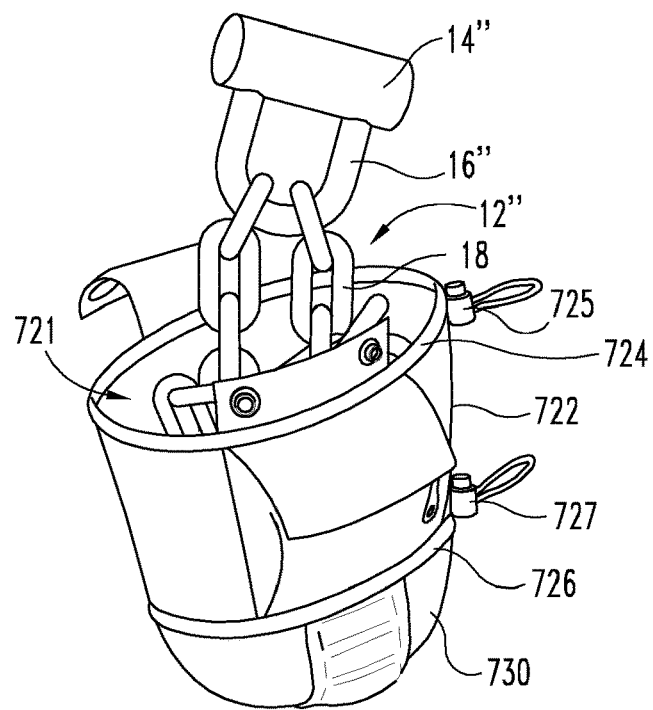
FIG. 41 is a front isometric view of the lock mounting assembly of FIG. 39 with a chain lock.

The support bar 622 includes a connection member 624 at one end configured for connection to a bicycle post or the like. The opposite end may include a reflector 626. The support bar 622 is configured to support a lower perimeter frame 634 and the lower support surface 630. The lower support surface 630 includes a fabric material 632 extending between and carried by lower perimeter frame 634. The lower frame 634 is configured to define a notch 637 along at least one of the lateral sides of the support surface 630. The upper support surface 640 is similar to the lower support surface 630 and includes an upper perimeter frame 644 and a fabric material 642. In the illustrated embodiment, the upper frame 644 extends only about three sides of the fabric material 642 such that the material 642 is slidably removable from upper frame 644. The upper frame 644 extends through the upper through bore 652 of each strap 650 such that the straps 650 remain attached to the upper support surface 640 unless the upper frame 644 is removed. A rod 653 extends through the lower through bores 651 of each of the straps 650 along a given lateral side of the mounting assembly 620. The rod 653 is configured to engage the lower frame 634 and retain the lower portions of the straps 650 within the respective notch 637. The rod 653 may be moved from the lower frame 634 such that the adjoined straps 650 are all pivotal about the upper frame 644 as shown in FIG. 37, allowing upper frame 644 and upper support surface 650 to be removed and provide access to a retaining area 649 around pocket 648. The straps 650 may be utilized to retain a portion of the shackle, cable, or chains of the locking apparatus stored between the support surfaces 630 and 640, for example the chain portion 18 of the lock 12".

Figure 36:
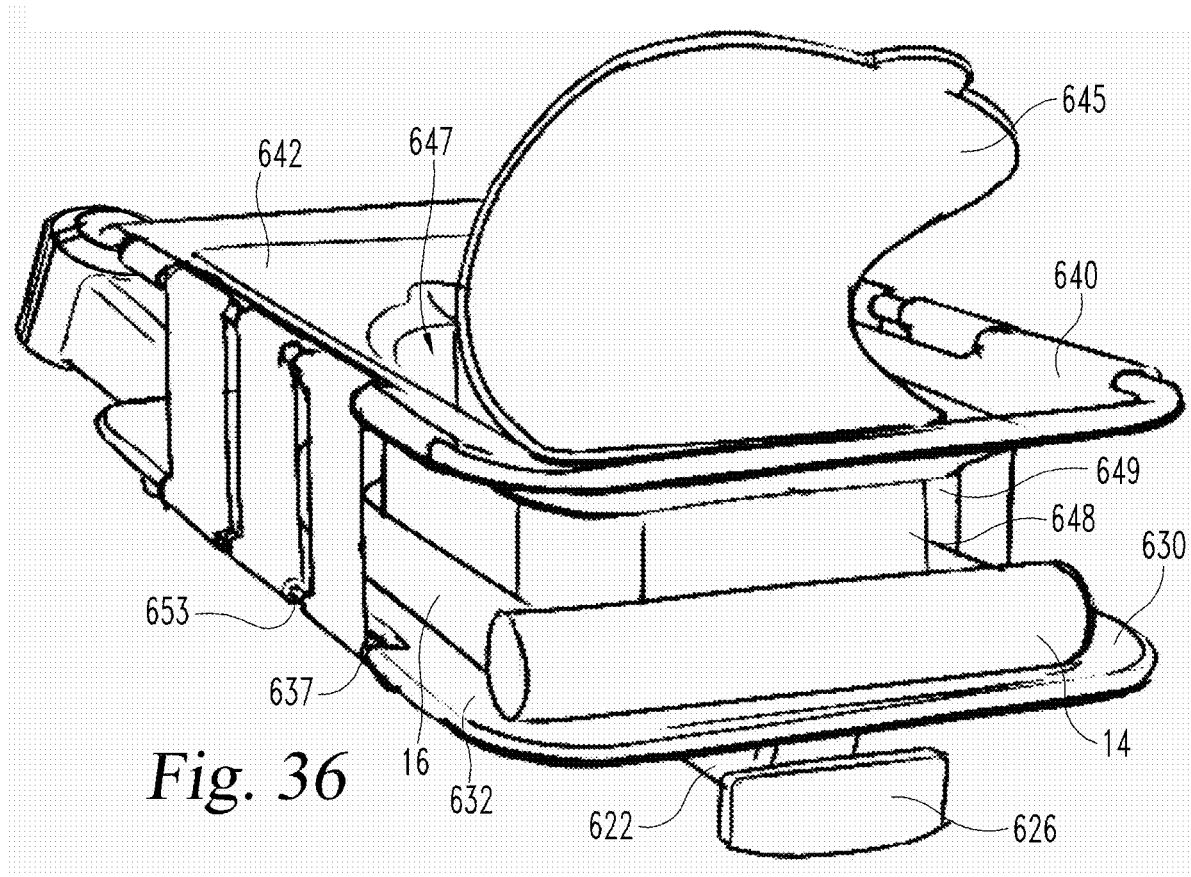
FIG. 36 is a rear isometric view of the lock mounting assembly of FIG. 34 with the storage flap partially open.

As shown in FIG. 36, the upper support surface 640 preferably defines an opening 647 and a material of pocket 648 extends about the perimeter of the opening 647 between the upper and lower support surfaces 640 and 630 to define storage pocket 648. A cover 645 is pivotally secured to the upper support surface 640 and covers the opening 647 to allow access to pocket 648 without removal of upper support surface 640 and upper frame 644. As shown in an alternate embodiment of FIG. 38, an additional storage compartment 660 may be attached to the upper support surface 640 and/or upper frame 644. The storage compartment 660 includes a side wall 662 extending from upper support surface 640 and/or a second lower surface (not shown) of compartment 660. A cover 664 is secured to the side wall 662 via a zipper 665 or the like that allows cover 664 to be opened to access the interior of storage compartment 660. The storage compartment 660 may be secured to the upper support surface 640 and/or upper frame 644 via hook and loop fasteners, snaps, straps, or any other suitable fasteners.

According to one aspect of the mounting assembly embodiment of FIGS. 34-38, there is disclosed a transportation device accessory that includes a locking apparatus configured to secure the transportation device to an object and a mounting assembly mountable to the transportation device and to the locking apparatus. The mounting assembly includes an elongated support bar extending between a first end connectable to the transportation device and an opposite second end that supports a lower frame. The lower frame supports a lower support surface and a wall defining a pocket that extends upwardly from the lower support surface. The lower frame and lower support surface further define a retaining area around the pocket. The mounting assembly also includes an upper frame defining an upper support surface removably positioned over the pocket and the lower support surface. The upper frame includes a first side movably connected to a first side of the lower frame and a second side removably connected to the lower frame so that the upper frame and upper support surface can be displaced away from the lower support surface to provide access to the retaining area. The locking apparatus is positioned in the retaining area around the pocket.

In one refinement of this aspect, a number of straps are provided along the first side that extend between and connect the upper and lower frames. In addition, a number of straps along the second side are connected to the upper frame and to a connecting rod. The connecting rod is removably engageable to a notch in the lower frame. In another refinement, the upper and lower support surfaces are comprised of fabric extending around respective ones of the upper and lower frames. In another refinement, the upper support surface defines a removable cover that extends across an upper opening of the pocket. In still another refinement, a side wall extends upwardly from the upper support surface. The side wall defines a storage compartment. A recloseable cover extends across the side wall to enclose and provide access to the storage compartment.

Figure 42:
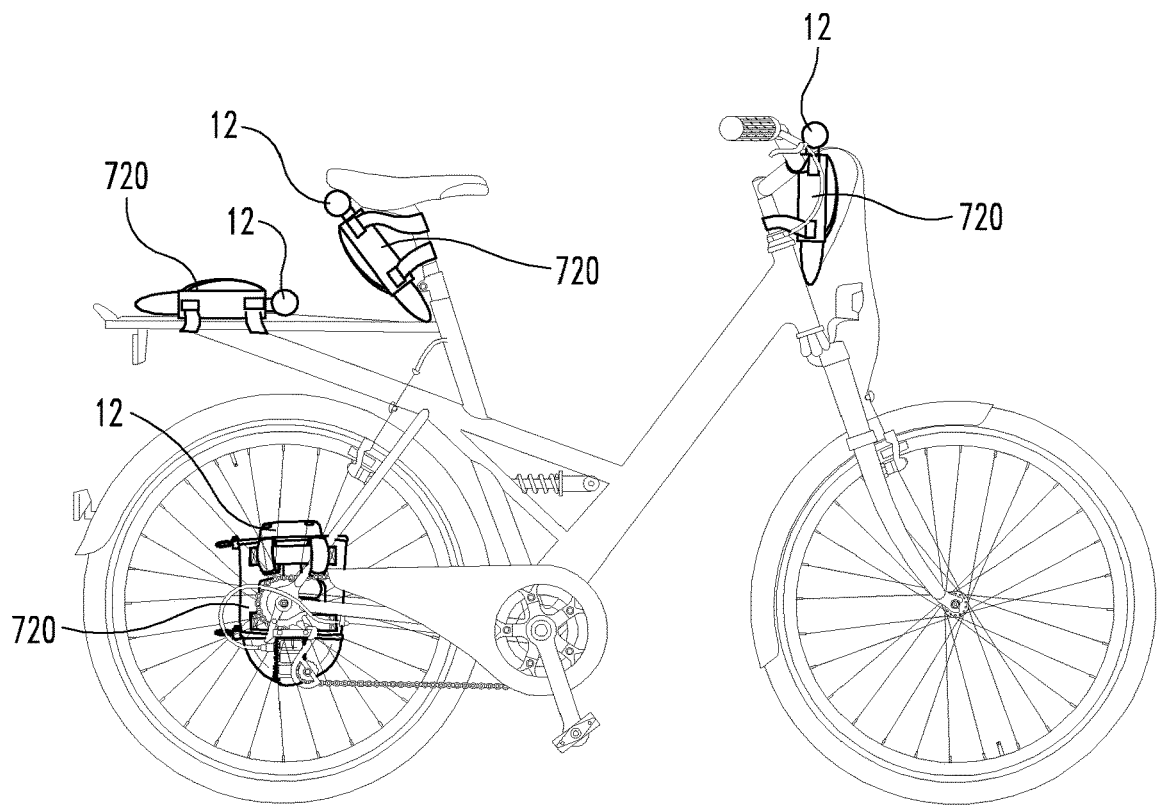
FIGS. 42-44 each provide a side elevation view of a bicycle illustrating the lock mounting assembly of FIG. 39 mounted to the bicycle at exemplary locations.
Figure 43:
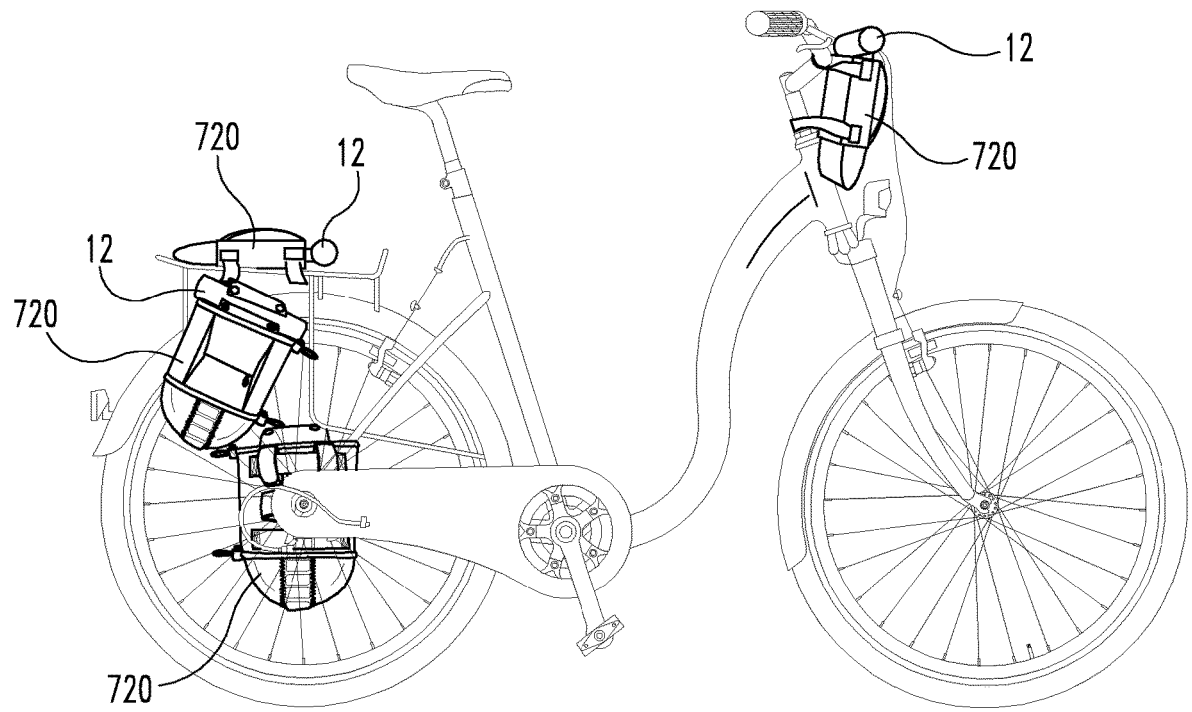
Figure 44:
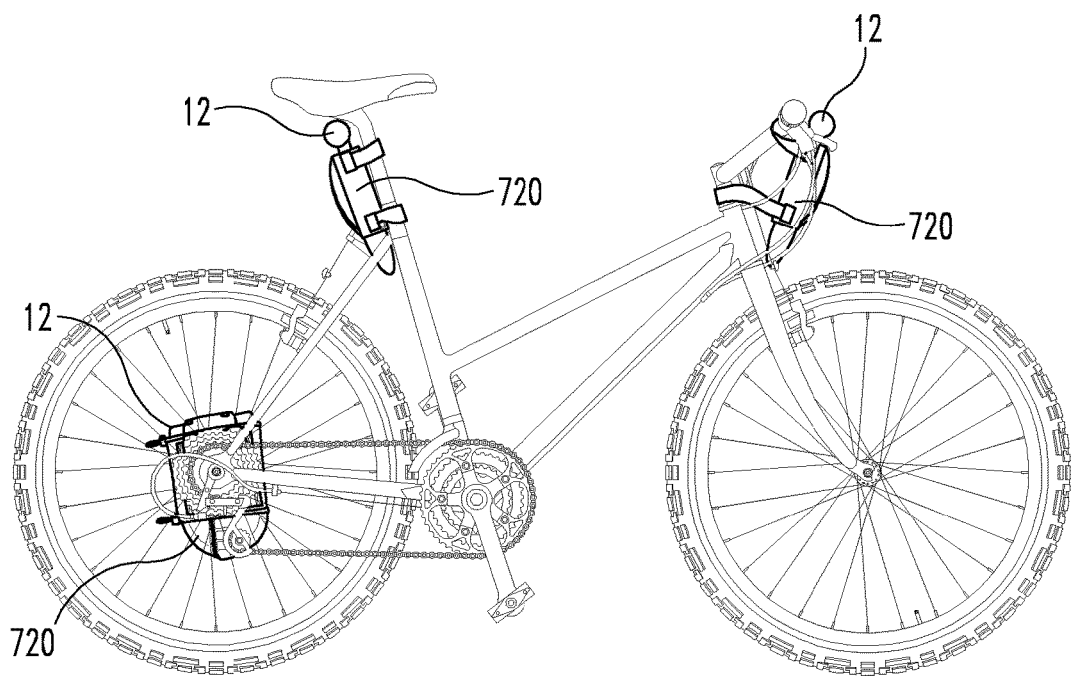
Figure 45:
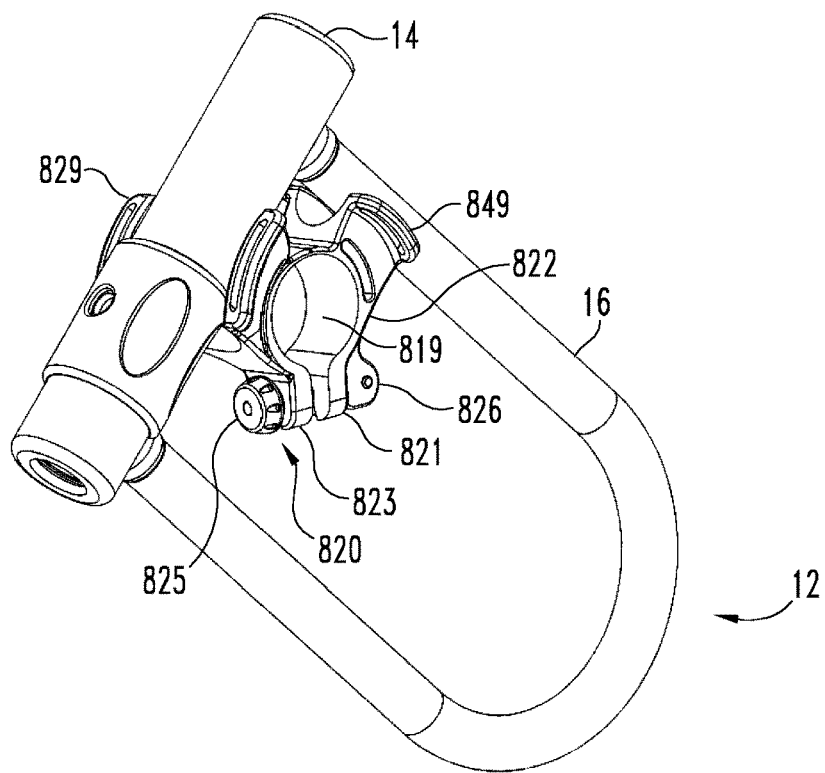
FIG. 45 is an isometric view of a lock mounting assembly and lock in accordance with another exemplary embodiment of the invention.

Referring to FIGS. 39-44, a mounting assembly 720 in accordance with another exemplary embodiment of the invention will be described. FIGS. 42-44 show mounting assembly 720 attached to a bicycle frame with a U-lock 12 supported in the mounting assembly 720. The mounting assembly 720 generally comprises an upper body 722 and lower body 730 defining a sack with an openable upper end 724 and a closed lower end 731. Upper body 722 and lower body 730 define a retaining area 721 therein. A flap 740 and support straps 760, 762 are provided on upper body 722.

The upper body 722 is defined by a tubular sleeve of fabric material and is joined at its lower end 726 to the lower body 730. The upper body 722 and lower body 730 may be manufacture from the same material or different material and may be made as a unitary component or separate components joined together. In the illustrated embodiment, the upper and lower bodies 722 and 730 are each manufactured from an expandable material to accommodate larger locks 12. Alternatively, either body 722, 730 may be manufactured from a less expandable material, but may be configured to expand in size via other mechanisms, for example, zippered sides which open to expand the given body 722, 730. In the illustrated embodiment, cinches 725 and 727 are provided adjacent to the upper 724 and lower ends 726 of the upper body 722 to allow the volume of the sack to be reduced if smaller locks are stored. An elastic strip 732 with cushioning pockets 734 may be provided adjacent to the closed end 731 to prevent the lock from impacting against the bicycle.

A flap 740 is provided adjacent to the open upper end 724 of the upper body 722 to close the open end 724. Snaps 741, 742, hook and loop fasteners (not shown) or any other suitable fastener may be utilized to secure the flap 740 across the open end 724. An external pocket 750 with a flap 752 secured with a zipper 754 may be provided for storage of additional items.

A variety of straps 760, 762 are preferably provided on the back side of the upper body 722 to facilitate attachment of the mounting assembly 720 to a bicycle or the like. The straps may include fixed straps 760 or moveable straps 762. The moveable straps 762 may be secured around a portion of the transportation device via hook and loop fasteners (not shown) or any other suitable fastener to mount mounting assembly 720 to the transportation device.

According to one aspect of the embodiment in FIGS. 39-44, there is disclosed a transportation device accessory including a locking apparatus configured to secure the transportation device to an object and a mounting assembly mountable to the transportation device to secure the locking apparatus on the transportation device. The mounting assembly includes an upper body and a lower body attached to a lower end of the upper body. The upper and lower bodies comprise a sack with an openable upper end and a closed lower end. The upper body and the lower body define a retaining area that is enclosed by a tubular sleeve of fabric material that is at least partially expandable to accommodate the locking apparatus in the retaining area. The upper body includes a first cinch at an upper end of the upper body and second cinch at the lower end of the upper body. The first and second cinches are operable to reduce a volume of the retaining area to secure the locking apparatus in the retaining area.

In one refinement of this aspect, the mounting assembly includes an elastic strip with cushioning pockets extending along an exterior of the lower body adjacent to the closed end to provide cushioning against the transportation device.

Figure 46:
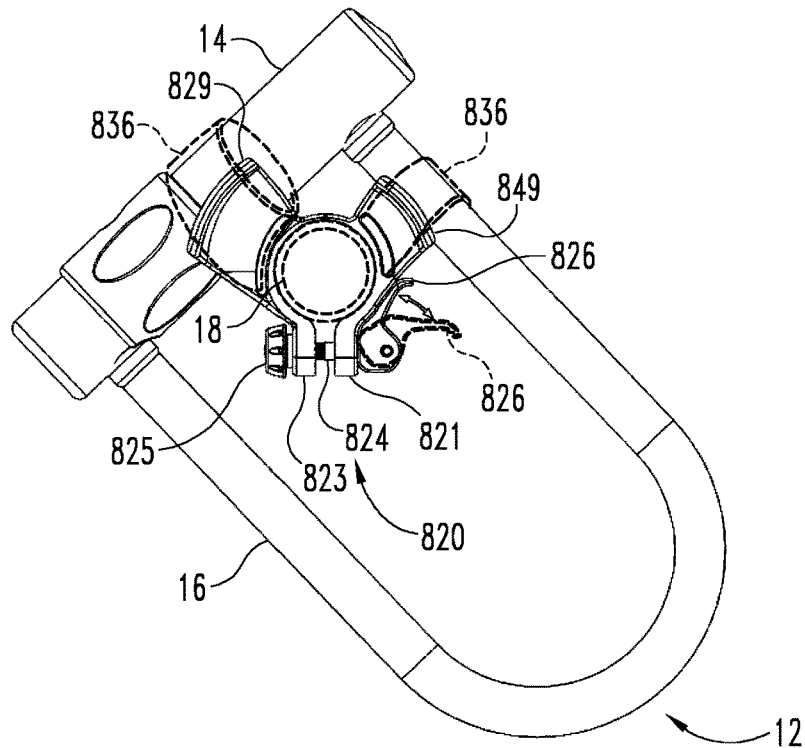
FIG. 46 is a top plan view of the lock mounting assembly of FIG. 45 mounted on a portion of an illustrative locking apparatus and a bicycle.
Figure 47:
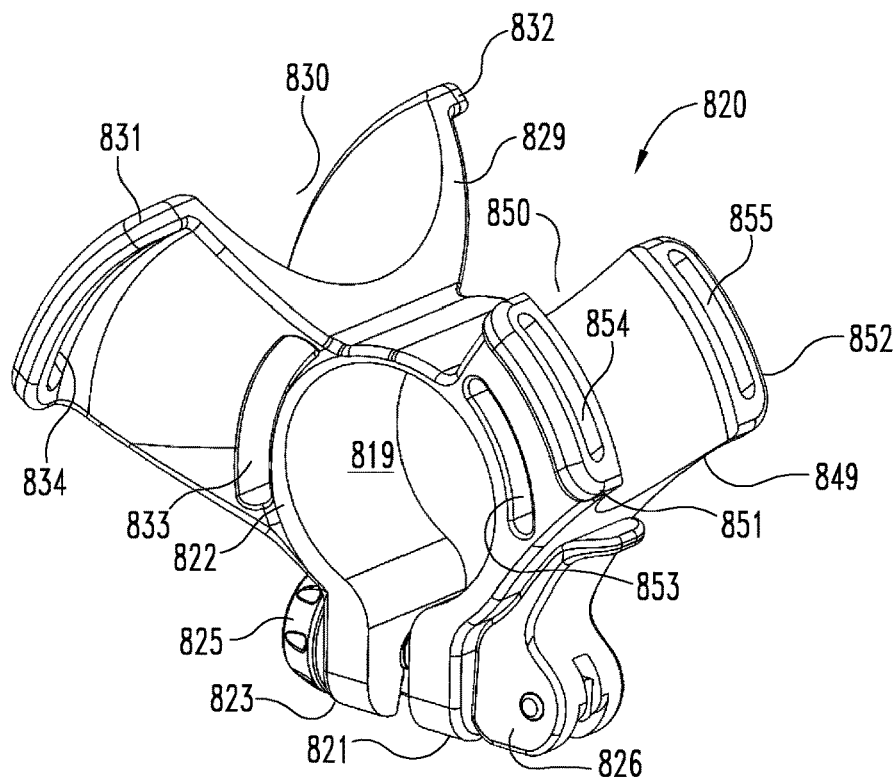
FIG. 47 is an isometric view of the lock mounting assembly of FIG. 45.
Figure 48:
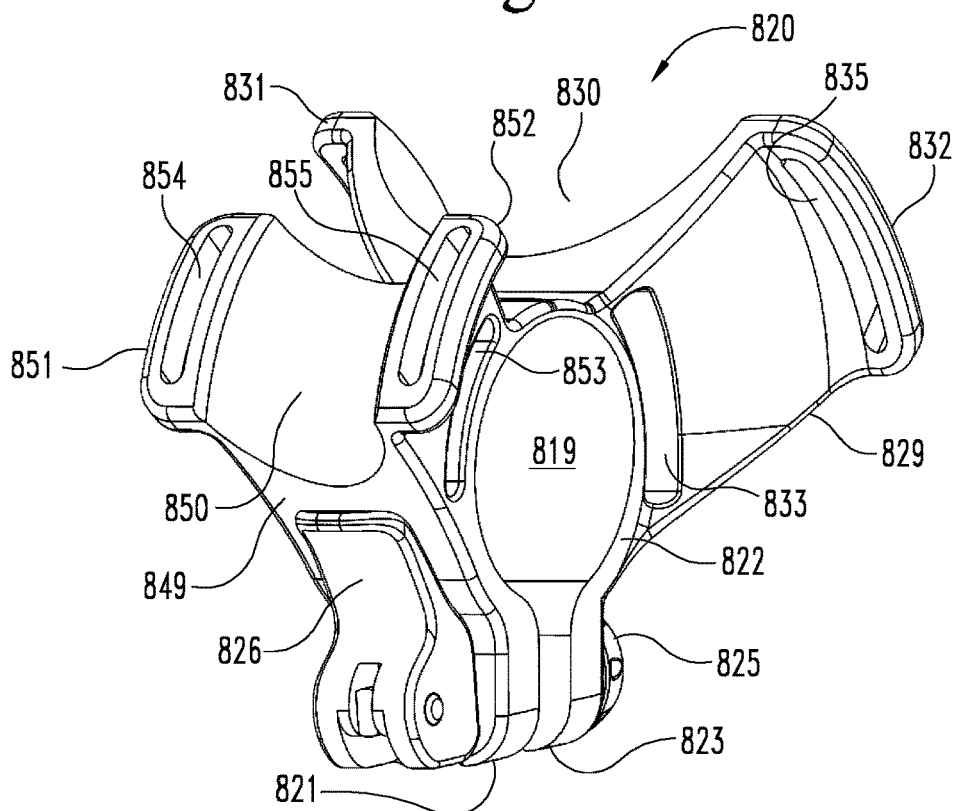
FIG. 48 is another isometric view of the lock mounting assembly of FIG. 45.

Referring to FIGS. 45-48, a mounting assembly 820 in accordance with another exemplary embodiment of the invention will be described. FIG. 46 shows mounting assembly 820 attached to a portion 18 of a bicycle frame, which can be at any one of the various positions on the bicycle disclosed herein for the U-lock 12 or cable lock 12'. The mounting assembly 820 generally comprises a bracket body 822, a connection bolt 824, a first receiving area 830 and a second receiving area 850 defined by respective ones of strap connectors 829 and 849, and elastic straps 836 mounted to respective ones of strap connectors 829 and 849 to secure the locking apparatus in receiving areas 830, 850.

The bracket body 822 defines a through hole 819 configured to receive portion 18 of the bicycle frame or the like. Opposed legs 821 and 823 extend from the bracket body 822 and support a connection bolt 824. In one embodiment, a nut 825 is threadably secured to one end of the bolt 824 and the other end includes a cam member 826. In other embodiments, cam member 826 can be omitted. In the illustrated embodiment, the nut 825 is tightened against the leg 823 and then the cam 826 is moved to a locked position (see cam member 826 in hidden lines in FIG. 18) to finally compress legs 821, 823 and secure the resilient bracket body 822 against portion 18. For portions of the bicycle having a smaller diameter, e.g. a seat post, or other location in which through-hole 819 to too large to provide a secure mounting arrangement, an adapter 350 may be provided as illustrated and discussed above with respect to FIG. 22.

Bracket 822 defines a flexible support for connectors 829, 849 extending outwardly therefrom to receive portions 14, 16, respectively, of locking apparatus 12. Connectors 829, 849 extend from the bracket body 822 to support transversely, orthogonally, or otherwise non-parallel oriented portions of locking apparatus 12. The receiving area 830 and the receiving area 850 of connectors 829, 849 are shaped to conform with the portion of the locking apparatus received therein to provide a secure engagement along with elastic straps 836. Elastic straps 836 extend from and are connected with respective ones of the connectors 829, 849 to releasably secure the locking apparatus portions against surfaces defining the receiving areas 830, 850. While two straps 836 are shown, the invention is not limited to such and may include more or fewer. In one embodiment, each strap 836 includes a series of hook and loop fasteners and attachment pad to provide quick and relatively simple securement and release of the locking apparatus.

As shown in FIG. 46, in order to retain a locking apparatus, each strap 836 is looped about a portion 14, 16 of the locking apparatus 12 and secured to a respective connector 829, 849 in any suitable manner that provides the desired fit and retention of the locking apparatus portion. First connector 829 includes a first passage 833 between bracket body 822 and first connector arm 831 and second connector arm 832. Connector arms 831, 832 define respective second and third passages 834, 835 for receiving strap 836 therethrough. Tensioning of strap 836 can flex connector arms 831, 832 toward one another to grip the portion 14 of locking apparatus 12 therebetween. Second connector 849 includes a first passage 853 between bracket body 822 and a first connector arm 851 and second connector arm 852. Connector arms 851, 852 define respective second and third passages 854, 855 for receiving the other of straps 836 therethrough. Tensioning of strap 836 can flex connector arms 851, 852 toward one another to grip the portion 16 of locking apparatus 12 therebetween.

In one aspect of the mounting assembly of FIGS. 45-48, a transportation device accessory includes a locking apparatus configured to secure the transportation device to an object and a mounting assembly mountable to the transportation device and to the locking apparatus. The mounting assembly includes a bracket releasably engageable to the transportation device having first and second connectors extending outwardly from a body of the bracket. The first and second connectors each include a first arm and a second arm defining a receiving area for receiving respective ones of first and second portions of the locking apparatus therein. The first and second straps are connected to respective ones of the first and second connectors and are positioned around respective ones of the first and second portions of the locking apparatus in engagement with a respective one of the first and second connectors to mount the locking apparatus to the mounting assembly.

In one refinement of this aspect, the bracket defines a first through-hole for receiving a portion of the transportation device therein and a pair of legs along one side of said bracket that define a gap therebetween. The bracket also includes a connection member extending through the pair of legs and a cam member operable to move the pair of legs toward one another to clampingly engage the bracket to the portion of the transportation device.

In another refinement of this aspect, the bracket defines a first passage between the bracket body and the first connector for receiving the first strap. The bracket also defines a second passage between the bracket body and the second connector for receiving the second strap. The first and second arms of the first connector each define respective ones of third and fourth passages for receiving the first strap, and the first and second arms of the second connector each define respective ones of the fifth and sixth passage for receiving the second strap. In a further refinement, tightening of the first and second straps flexes the first and second arms of the respective one of the first and second connectors to tighten the first and second arms thereof around the respective one of the first and second portions of the locking apparatus positioned therein.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A transportation device accessory, comprising:
a locking apparatus configured to secure a transportation device to an object; and
a mounting assembly mountable to the transportation device and adapted to receive said locking apparatus to secure said locking apparatus on the transportation device, said mounting assembly comprising:
an upper body; and
a lower body extending from a lower end portion of said upper body;
wherein said upper and lower bodies comprise a sack with an openable upper end and a closed lower end;
wherein said upper body and said lower body define a retaining area that is enclosed by a tubular sleeve of fabric material that is at least partially expandable to accommodate said locking apparatus in said retaining area; and
wherein said upper body includes a first cinch at an upper end portion of said upper body and a second cinch at said lower end portion of said upper body, said first and second cinches operable to reduce a volume of said retaining area to secure said locking apparatus in said retaining area.

2. The transportation device accessory of claim 1, further comprising an elastic strip with cushioning pockets extending along an exterior portion of said lower body adjacent to said closed end to provide cushioning against the transportation device.

3. The transportation device accessory of claim 1, further comprising a flap connected to said upper body adjacent said openable upper end;
wherein said flap is extendable across said openable upper end; and
wherein said flap is securable across said openable upper end by at least one fastener.

4. The transportation device accessory of claim 3, wherein said at least one fastener comprises a first snap element attached to said flap and a second snap element attached to said openable upper end of the upper body.

5. The transportation device accessory of claim 3, wherein said at least one fastener comprises a hook and loop fasteners.

6. The transportation device accessory of claim 1, further comprising an external pocket attached to said upper body to provide said mounting assembly with an additional storage compartment.

7. The transportation device accessory of claim 1, further comprising at least one strap extending from the upper body and adapted to extend about a portion of the transportation device to secure said mounting assembly to the transportation device.

8. The transportation device accessory of claim 7, wherein said at least one strap comprises hook and loop fasteners.

9. The transportation device accessory of claim 7, wherein said at least one strap comprises a fixed strap fixedly attached to said upper body and a movable strap extending about said fixed strap and the portion of the transportation device to mount said mounting assembly to the transportation device.

10. The transportation device accessory of claim 1, wherein said locking apparatus comprises a U-lock, a cable lock, or a chain lock.

11. A transportation device accessory, comprising:
a locking apparatus configured to secure a transportation device to an object; and
a mounting assembly mountable to the transportation device and adapted to receive said locking apparatus to secure said locking apparatus on the transportation device, said mounting assembly comprising:

a tubular sleeve having an openable upper end and a closed lower end defining a sack, said tubular sleeve comprising an elastic material defining a retaining area that is at least partially expandable to accommodate at least a portion of said locking apparatus therein; and at least one strap extending from said tubular sleeve and adapted to extend about a portion of the transportation device to releasably mount said mounting assembly to the transportation device.

12. The transportation device accessory of 11, wherein said mounting assembly further comprises a first cinch positioned adjacent said openable upper end of said tubular sleeve, said first cinch operable to at least partially reduce said openable upper end of said tubular sleeve.

13. The transportation device accessory of 12, wherein said mounting assembly further comprises a second cinch positioned between said first cinch and said closed lower end of said tubular sleeve.

14. The transportation device accessory of 13, wherein said first and second cinches are operable to reduce a volume of said retaining area of said expandable sleeve to secure said locking apparatus in said retaining area.

15. The transportation device accessory of claim 11, further comprising a flap connected to said tubular sleeve adjacent said openable upper end;
wherein said flap is extendable across said openable upper end; and
wherein said flap is securable across said openable upper end by at least one fastener.

16. The transportation device accessory of claim 11, further comprising an external pocket attached to said tubular sleeve to provide said mounting assembly with an additional storage compartment.

17. The transportation device accessory of claim 11, wherein said at least one strap comprises hook and loop fasteners.

18. The transportation device accessory of claim 11, wherein said at least one strap comprises a fixed strap fixedly attached to the tubular sleeve and a movable strap extending about said fixed strap and the portion of the transportation device.

19. The transportation device accessory of claim 11, wherein said locking apparatus comprises a U-lock, a cable lock, or a chain lock.

20. The transportation device accessory of claim 11, wherein further comprising an elastic strip with cushioning pockets extending along an exterior portion of said closed end of said tubular sleeve to provide cushioning against the transportation device.

21. A transportation device accessory, comprising:
a locking apparatus configured to secure a transportation device to an object; and
a mounting assembly mountable to the transportation device and adapted to receive said locking apparatus to secure said locking apparatus on the transportation device, said mounting assembly comprising:
a tubular sleeve having an openable end and comprising an elastic material defining a retaining area that is at least partially expandable to accommodate at least a portion of said locking apparatus therein; and
at least one retention element attached to said tubular sleeve and adapted to couple with a portion of the transportation device to releasably retain said mounting assembly to the transportation device.

22. The transportation device accessory of 21, wherein said mounting assembly further comprises a first cinch positioned adjacent said openable end of said tubular sleeve, said first cinch operable to at least partially reduce said openable end of said tubular sleeve.

23. The transportation device accessory of claim 21, further comprising a flap connected to said tubular sleeve adjacent said openable end;
wherein said flap is extendable across said openable end; and
wherein said flap is securable across said openable end.

24. The transportation device accessory of claim 21, wherein said at least one retention element comprises a strap including hook and loop fasteners.

25. The transportation device accessory of claim 21, wherein said at least one retention element comprises a fixed strap fixedly attached to the tubular sleeve and a movable strap extending about said fixed strap and the portion of the transportation device.

* * * * *